United States Patent [19]

Pommerening

[11] 3,975,596
[45] Aug. 17, 1976

[54] TRUNK CONSULTATION ARRANGEMENT

[75] Inventor: Uwe A. Pommerening, Webster, N.Y.

[73] Assignee: Stromberg-Carlson Corporation, Rochester, N.Y.

[22] Filed: Mar. 25, 1975

[21] Appl. No.: 561,825

Related U.S. Application Data

[63] Continuation-in-part of Ser. No. 561,744, March 25, 1975, Pat. No. 3,936,615.

[52] U.S. Cl. .......................... 179/18 BC; 179/18 AD
[51] Int. Cl.² ........................................ H04M 3/56
[58] Field of Search ...... 179/18 BD, 18 BC, 18 DA, 179/18 AD, 18 B

[56] References Cited
UNITED STATES PATENTS

| | | | |
|---|---|---|---|
| 3,497,631 | 2/1970 | Pearce et al. .................. | 179/18 BC |
| 3,725,599 | 4/1973 | Krock et al. .................... | 179/18 BD |
| 3,736,383 | 5/1973 | Le Baron ........................ | 179/18 HA |
| 3,748,396 | 7/1973 | Hestad et al. .................. | 179/18 DA |
| 3,821,485 | 6/1974 | Harrington et al. ............ | 179/18 DA |
| 3,859,474 | 1/1975 | Gueldenpfennig et al. ..... | 179/27 DA |

Primary Examiner—Thomas W. Brown
Attorney, Agent, or Firm—William F. Porter, Jr.; William A. Marvin

[57] ABSTRACT

An arrangement is disclosed for providing trunk consultation in an electronic private automatic branch exchange which is built around a space divided solid state matrix. The trunk consultation arrangement is enabled by a hookswitch flash from a consulting PABX station connected to an established incoming or outgoing trunk call and directs the trunk junctor associated with that call to place the connected trunk on hold. While the connected trunk junctor is in a held status, the consulting PABX station is forwarded to a local junctor where the consulted trunk party is dialed. A connection between the consulting PABX station and the consulted trunk party is then established via a second trunk junctor. Further circuitry is provided in the trunk consultation arrangement to establish a three-way consultation between the consulting PABX station, the consulted trunk party, and the held trunk party.

6 Claims, 15 Drawing Figures

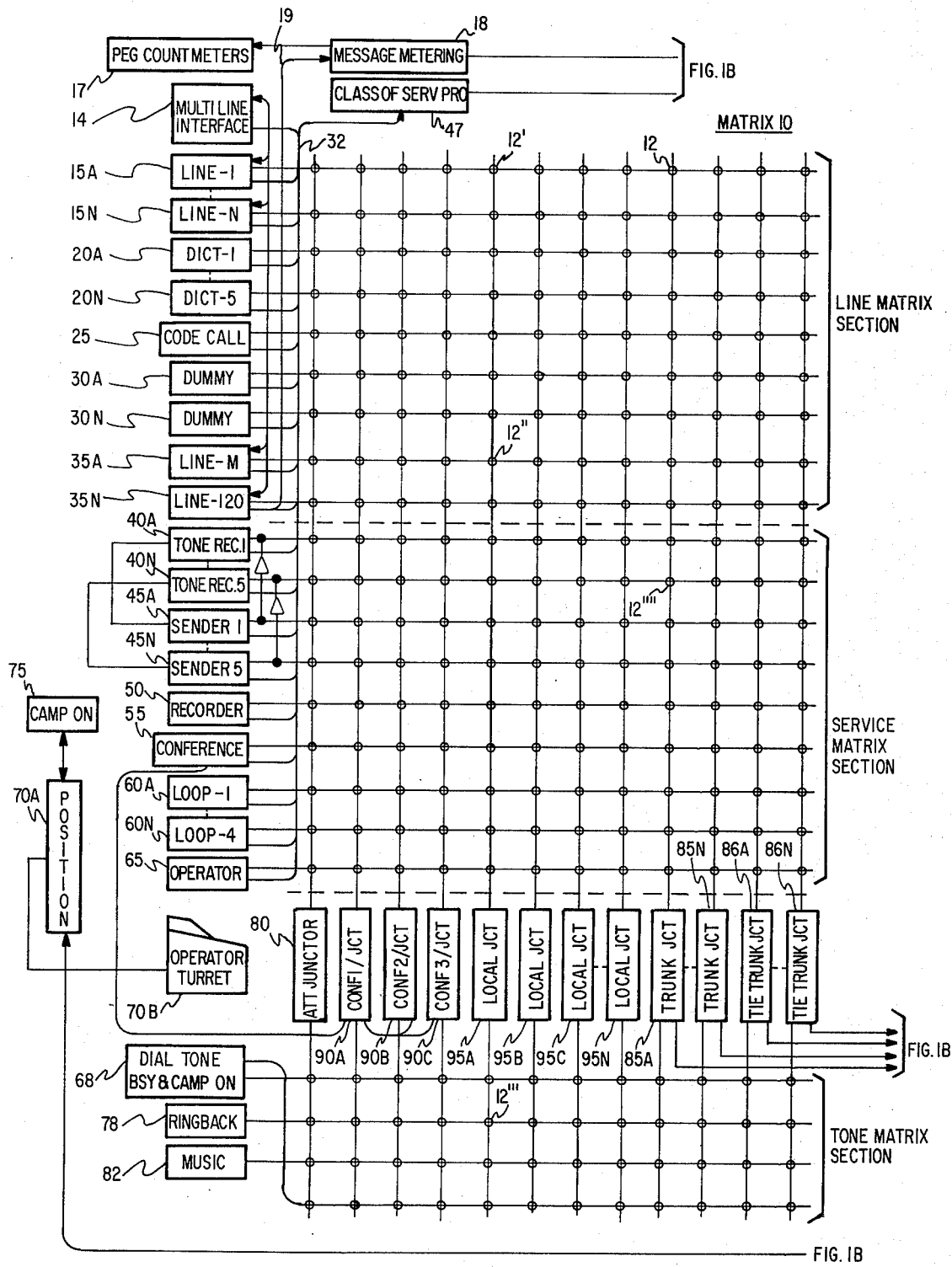
FIG. IA

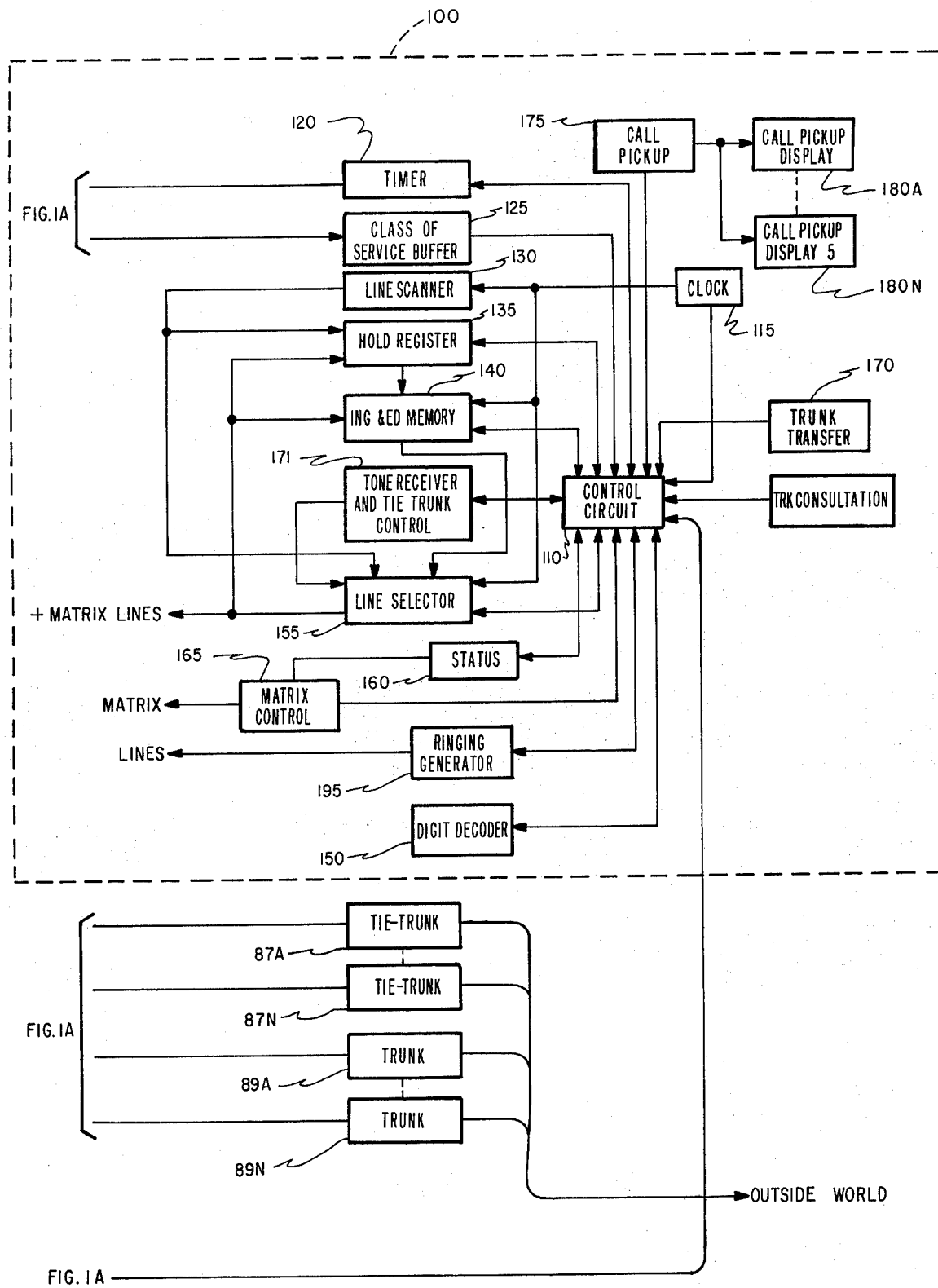
FIG. IB

TRUNK CONSULTATION ARRANGEMENT

CROSS-REFERENCE TO RELATED APPLICATION

The present application is a continuation-in-part of a copending application, entitled, "Trunk Transfer Circuit", Ser. No. 561,744, filed on Mar. 25, 1975, now U.S. Pat. No. 3,936,615 in the name of Uwe A. Pommerening, the disclosure of which is herein incorporated by reference.

BACKGROUND OF THE INVENTION

The present invention relates generally to special feature systems for an electronic private automatic branch exchange and more particularly to a trunk consultation feature for an electronic private automatic branch exchange which is built around a space divided solid state matrix.

Electronic private automatic branch exchanges are known in the art to provide circuitry for establishing audio paths between PABX stations or between central office trunks and PABX stations. These connections are usually accomplished through the use of a common control which directs the path finding and supervisory functions of a space divided crosspoint matrix on which the PABX station lines and central office trunk circuits appear. Normally, once a path is found between two appearances of the matrix, a sleeve lead is energized to hold the crosspoints of the matrix establishing the connection.

In addition to the normal control of connections between two PABX stations or a central office trunk and a PABX station, it is desirable in private automatic branch exchanges to provide certain special features to add to the flexibility of the exchange and provide additional enhancements desired by the customers. One such special feature that is useful and has gained customer acceptance in many PABX applications is that of trunk transfer.

The trunk transfer feature allows a PABX station (hereinafter called the "transferring station") which is connected to an established incoming or outgoing trunk call (hereinafter called the "transferred party") to hold the connection to the transferred party while signaling the common control to establish a connection to a PABX station (hereinafter called the "transferee station") and then to connect the transferred party to the transferee PABX station. Thus, an incoming trunk caller reaching the wrong PABX station or wishing to talk with an individual at another PABX station after a first connection to a local station may be transferred to the desired transferee PABX station without having to redial. Similarly, a party connected to the PABX via an outgoing trunk may wish to talk to another PABX station after the first connection is completed and may be transferred without dialing.

A novel and advantageous circuit for performing the special feature of trunk transfer in an electronic private automatic branch exchange is described in the application cross-referenced above. In addition to the trunk transfer feature, another useful special feature that may be incorporated into a PABX system is trunk consultation. The trunk consultation feature provides an arrangement to allow a PABX station (hereinafter called the "consulting party") to hold a connected trunk party while establishing a connection to a second trunk party (hereinafter called the "consulted party"). After consultation with the second trunk party, the consulting party usually returns to the original call and the consulted party is released.

In the electronic private automatic branch exchange described, many of the operations performed by the trunk transfer feature can be used additionally to perform similar functions in the trunk consultation operation.

SUMMARY OF THE INVENTION

The present invention provides the special feature of trunk consultation in an electronic private automatic branch exchange which is built around a space divided rectangular solid state matrix.

The trunk consultation arrangement incorporating trunk transfer circuitry includes circuitry for sensing a consultation indicating signal from a consulting PABX station connected to an established call in a first trunk junctor. Once the sensing circuitry has detected the consultation indicating signal, means for holding the first trunk junctor of the established call are utilized to prevent the trunk party from being released. The consultation arrangement also includes means for signaling from a local junctor and seizing the intended consulted trunk by way of a second trunk junctor while the original trunk junctor is being held. Further means provide for a three-way trunk consultation conference between the consulting, consulted, and held trunk party.

It is therefore a major object of the invention to provide an improved trunk transfer circuit including provision for trunk consultation operation.

These and other features, objects, and advantages of the present invention will become clearer and more evident from the following detailed description of a preferred embodiment viewed in conjunction with the accompanying drawings, wherein:

BRIEF DESCRIPTION OF THE DRAWINGS

FIGS. 1A and 1B, in combination, form a schematic block diagram of an electronic private automatic branch exchange incorporating the present invention;

DETAILED DESCRIPTION OF THE PREFERRED EMBODIMENT

Figure 2C:
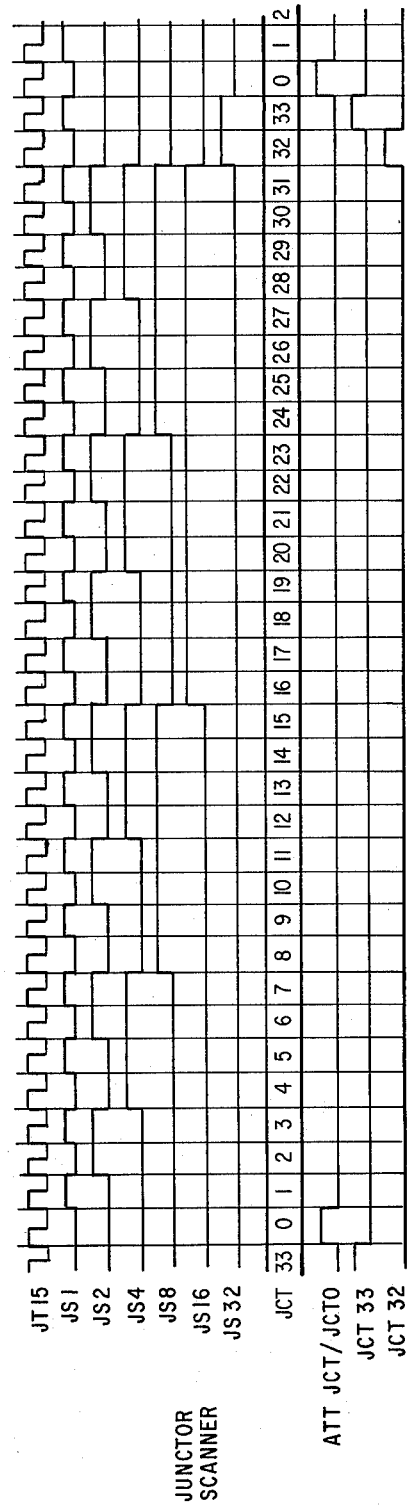
FIGS. 2A, 2B and 2C are waveform diagrams of clock signals used to control the timing functions of the system.

The present invention will now be described in conjunction with an electronic private automatic branch exchange which is built around a space divided solid state matrix. The exchange is shown in system block diagrams in FIGS. 1A and 1B and includes a solid state switching matrix 10.

The matrix 10 is a single stage rectangular array of crosspoints divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15A through 15N and 35A through 35N. Between the line circuits there are provided connections to special lines which take the place of regular lines in the system. These special lines are dictation access circuits 20A through 20N, a code call circuit 25 and a plurality of dummy line tie trunks 30A through 30N.

Line appearances at the service matrix section take the form of a plurality of tone receivers 40A through 40N, a plurality of register senders 45A through 45N, an intercept recorder 50, a conference bridge 55, a plurality of operator loop circuits 60A through 60N and an operator line circuit 65. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1. The junctor appearances are associated with an attendant junctor 80, a plurality of conference junctors 90A through 90C, a plurality of local junctors 95A through 95N, a plurality of trunk junctors 85A through 85N and a plurality of tie trunk junctors 86A through 86N. The trunk junctors 85A through 85N are connected to corresponding trunks 89A through 89N, and the tie trunk junctors 86A through 86N are associated with corresponding tie trunks 87A through 87N.

The tone matrix section of the matrix 10 provides inputs on respective lines from a combined dial tone generator and busy-camp on tone generator 68, along with inputs from a ring-back tone generator 78 and music source 82. The outputs of the tone matrix section are connected through the respective junctors to the junctor appearances of the line and service matrix sections of the matrix 10.

The operator complex includes, in addition to the loop circuits 60A through 60N and the operator line circuit 65, an operator position circuit 70A to which is connected an operator turret 70B.

A camp-on circuit 75 providing a special feature in the system is also connected to the operator position circuit 70A. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class-of-service programmer 47 connected to the common control equipment 100, FIG. 1B.

FIG. 1B schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necessary within the system.

A class-of-service buffer 125 forms an interface between the class-of-service programmer 47 and the logic circuitry of the common control 100. Thus, the various line conditions which are derived through the class-of-service programmer 47 each time a line is addressed will be passed to the control circuits 110 through the class-of-service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class-of-service programmer 47 to the control circuit 110 in the common control 100 via the class-of-service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of a communication connection between parties and in providing various functions requested by the parties during the call, it is necessary at various times to temporarily store information as functions are being performed within the system by the common control 100. The hold register 135 provides the temporary storage capability in the system.

The system includes an ING and ED memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to the junctor will produce the calling and/or called numbers of these lines which are stored therein. In this way, the identity of the crosspoints in the matrix 10 associated with the line or lines involved with the junctor can be identified for purposes of processing and connecting call circuits, each junctor and its associated junctor memory forming a connecting and processing assist unit.

A line selector 155 receives line designations from the line scanner 130 and from the junctor memory 140, and in response to the clock signals from the clock 115 selectively addresses crosspoints in the matrix 10 and selected lines at the proper times. As already indicated in connection with the description of the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class-of-service programmer 47 and class-of-service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the crosspoint which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system in reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system provides a local transfer circuit 170 which effects transfer between stations, as may be required.

A further special feature of the present invention is embodied in a call pickup arrangement including a call pickup circuit 175 and a plurality of call pickup displays 180A through 180N. In accordance with this special feature, a party may respond to a call to another party identified on the call pickup display.

The function of the various elements of the system of the present invention will become clearer from the general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class-of-service programmer 47 along with the class-of-service information concerning that line circuit to the common control 100.

Assuming that the line circuit 15A has gone off-hook and is requesting service, this line will ultimately be addressed by the line selector 155 when the line scanner 130 reaches this line in its scan of all of the lines. At the same time, the line selector 155 will also address all of the crosspoints of the matrix 110 associated with that line circuit. In this case, all of the crosspoints associated with the line circuit 15A along the first horizontal of the matrix including the crosspont 12' will be addressed. If, as a result of some misoperation, one or more of these crosspoints has been inadvertently closed, the addressing of the crosspoints at this time will automatically open the crosspoints in the absence of the positive control from the matrix control 165 indicating that one or more of these crosspoints should be closed. Since the line 15A has just requested service, none of the crosspoints should be closed and therefore the status circuits 160 will provide no indication to the matrix control 165 that any of the crosspoints involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof. Further details concerning the unique operation of the matrix under control of the line scanner 130, line selector 155 and matrix control 165 are disclosed in U.S. Pat. No. 3,903,374 entitled "Control System for Electronic PABX Switching Matrix" assigned to the same assignee as the present application.

When the control circuit 110 receives an indication through the class-of-service buffer 125 that the line circuit 15A has requested service, the control circuits 110, which include a junctor allotter and is more fully described in U.S. Pat. No. 3,909,544 entitled "Junctor Allotter" assigned to the same assignee as the present invention, will assign a free junctor to the line circuit and request that the calling line number of the line circuit 15A be stored in the junctor memory 140 in the time position assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95A, the calling line number of the line circuit 15A will be stored in the memory position of the junctor memory 140 permanently assigned to the local junctor 95A, and each time the junctors are scanned, the line number of the calling line 15A will be forwarded to the line selector 155 so that the line 15A can be addressed at this time and the crosspoint associated both with the line 15A and the junctor 95N, i.e., the crosspoint 12' can be addressed. The status circuit 160 indicates to the matrix control 165 that the call is in a state wherein the crosspoint 12' should be closed, and therefore the matrix control 165 will forward a positive request for closing the crosspoint 12' at the time the crosspoint is addressed. As a result, the line circuit 15A will be connected through the matrix 10 to the local junctor 95N.

At the same time that the crosspoint 12' is addressed and closed to enable connection between the line circuit 15A and the local junctor 95A, the matrix control 165 under control of the status circuit 160 addresses the crosspoints of the tone matrix section of the matrix 10 associated with the dial tone generator 68 so that the crosspoint 12''' will be closed connecting the dial tone generator 68 through the local junctor 95A to the line circuit 15A. The line circuit may then commence to dial the number of the party to which it desires connection.

The control circuits 110 in the common control 100 will advance the status circuit 160 of the particular junctor 95A to state 2 if the calling line circuit has rotary dial equipment or to state 3 if the calling line circuit has TONE-DIAL (multifrequency dialing) equipment, as determined from the class-of-service information for that line circuit received from the class-of-service programmer 47. Each time the junctor 95A is scanned, the number of the calling line circuit 15A will be provided by the junctor memory 140 to the line selector 155 which will address the line permitting the calling bridge relay state to be monitored via the bus 32 and class-of-service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95A both the calling and called line numbers.

When it is determined by the timer 120, more fully described in copending application Ser. No. 542,947, filed on January 22, 1975, entitled, "Timer Apparatus" and assigned to the same assignee as the present application, that the calling line 15A has completed dialing, the control circuits 110 will advance the status circuit 160 to record state 4 in the position of the memory thereof assigned to the junctor 95A. State 4 relates to busy test, and more fully described in copending application Ser. No. 543,042, filed on Jan. 22, 1975, entitled, "Busy Test Arrangement For EPABX" and assigned to the same assignee as the present application, of the busy called line circuit. If the called line circuit is found to be busy, the tone matrix section of the matrix 10 is once again addressed from the matrix control 165 to connect busy tone from the generator 68 through the local junctor 95A to the calling line circuit 15A. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95A to the calling line circuit 15A. The control over the tone matrix section of the matrix 10 to provide for connection of dial tone, busy tone, ring back tone and music to the lines through selected junctors is described in greater detail in U.S. Pat. No. 3,909,831 entitled "Tone Control Arrangement for Electronic PABX" assigned to the same assignee as the present application.

Figure 3:
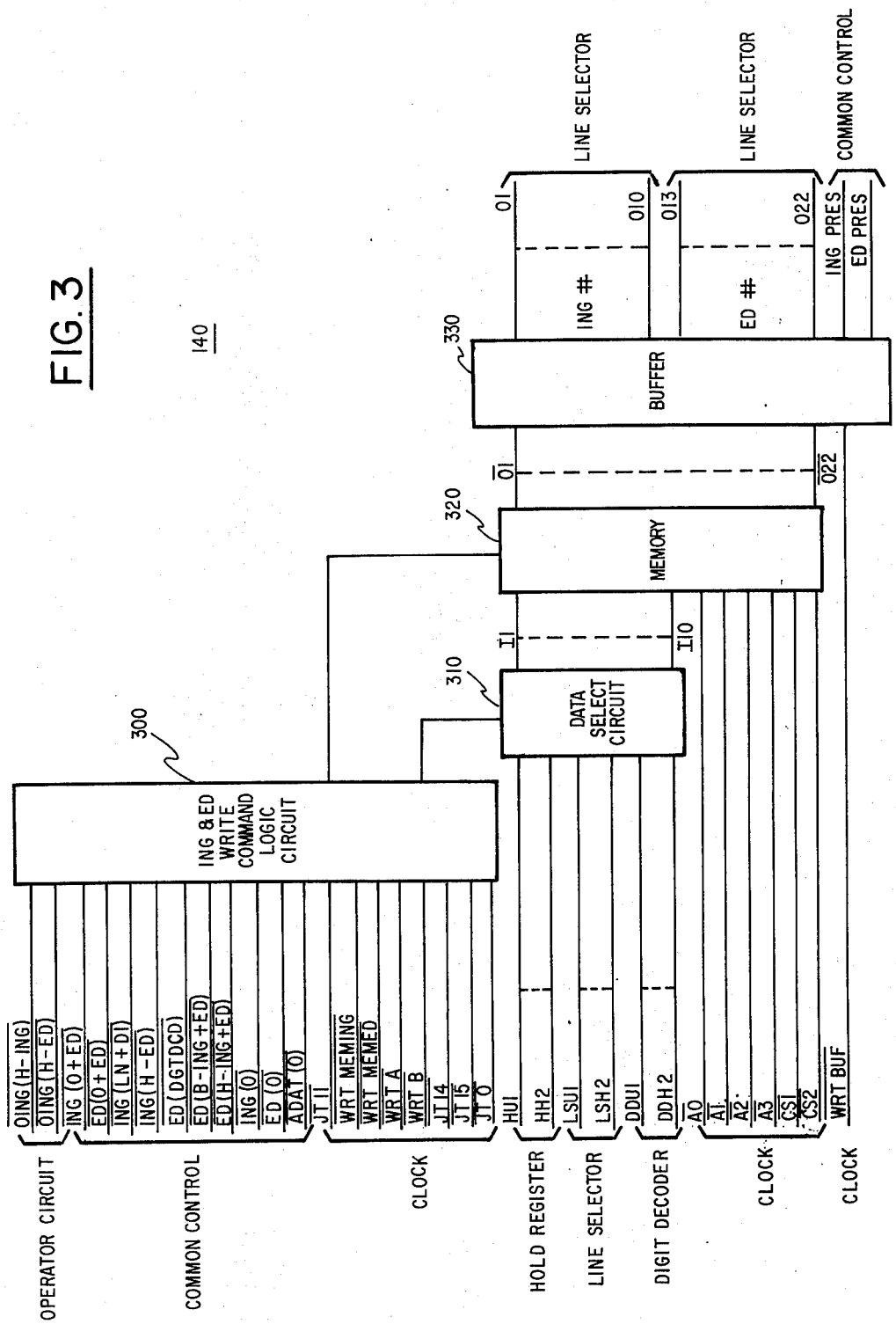
FIG. 3 is a schematic block diagram of a junctor memory associated with the present invention.

The matrix control 165, upon receiving the calling and called line numbers from the junctor memory 140 as the junctor 95A is scanned, will address the crosspoint 12' and also the crosspoint associated with the called line, for example, crosspoint 12'' associated with the line 35A. Thus, when the called part answers in response to the applied ringing, he will be connected via crosspoints 12' and 12'' in the matrix 10 to the calling party, and the respective line circuits 35A and 15A will receive ground to maintain crosspoint bias, as described in connection with FIG. 3, from the local junctor 95A during the duration of the call. At this time, the status circuit 160 is advanced by the control circuits 110 to status 7, indicating to the system that a local call is in progress.

Where the lines are equipped with TONE-DIAL (multi-frequency) equipment, this class-of-service for the line circuit is indicated to the common control by the class-of-service programmer 47. In this regard, the class-of-service programmer 47 typically includes a panel having selected class-of-service plugs so that the features of the system may be allocated on a real time line basis and the information with respect thereto may be provided to the common control 100. Thus, in addition to providing a path for the calling bridge relay information from the lines, the class-of-service programmer 47 also submits at this time class-of-service data concerning the particular line for use by the common control 100.

When a call is in state 3 indicating dialing from TONE-DIAL (multi-frequency) equipment, the common control 100 effects connection via the matrix between the calling line and an available one of the tone receivers 40A through 40N. The tone receiver converts the TONE-DIAL signal into the corresponding binary number, which is received by the common control 100 and placed into the ING or ED memory 140.

Since the operator loop circuits 60A through 60N are merely provided as line appearances at the input of the matrix 10, the functions associated with the operator positions are greatly simplified. Because of the fast switching capability of the crosspoints in the matrix 10, the split functions normally associated with incoming connections to the operator may be performed with the matrix crosspoints. Thus, special trunk circuits having separate operator access with split tip and ring pairs, as normally required in conventional systems, are not required in the system of the present invention.

In addition, since the split functions are performed in the present system within the matrix 10 by selective operation of the crosspoints, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the attendant junctor 80 controls the crosspoints for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to one of local junctors 95A-95C upon detection of the request for service in the manner described above by closing the crosspoint in the matrix 10 common to the line circuit and a selected available local junctor. In the foregoing example, by closing local junctor 95A. An addressing of the tone matrix section provides connection of the dial tone generator 68 through crosspoints 12''' and the local junctor 95A to the line circuit 15A. When dialing commences, the crosspoint 12''' is released, disconnecting dial tone from the line circuit and the dialing impulses are received in the common control 100 via the class-of-service programmer 47. The digit decoder 150 for outgoing trunk calls will recognize the first digit as a request for access to a trunk circuit and the control circuits 110 will indicate the need to connect to a trunk junctor. The junctor allotter, more fully described in above cited U.S. Pat. No. 3,909,544 in the control circuits 110 will select an available trunk junctor, for example, the junctor 85A connected to the trunk 89N.

As can be seen, with the arrangement of the present invention, many different functions can be performed during the time in which a junctor is being scanned through selective control of various crosspoints within the matrix 10 under control of the common control 100 during designated time slots of the junctor scan period, as will be described in greater detail in connection with the system timing.

SYSTEM TIMING

Figure 2A:
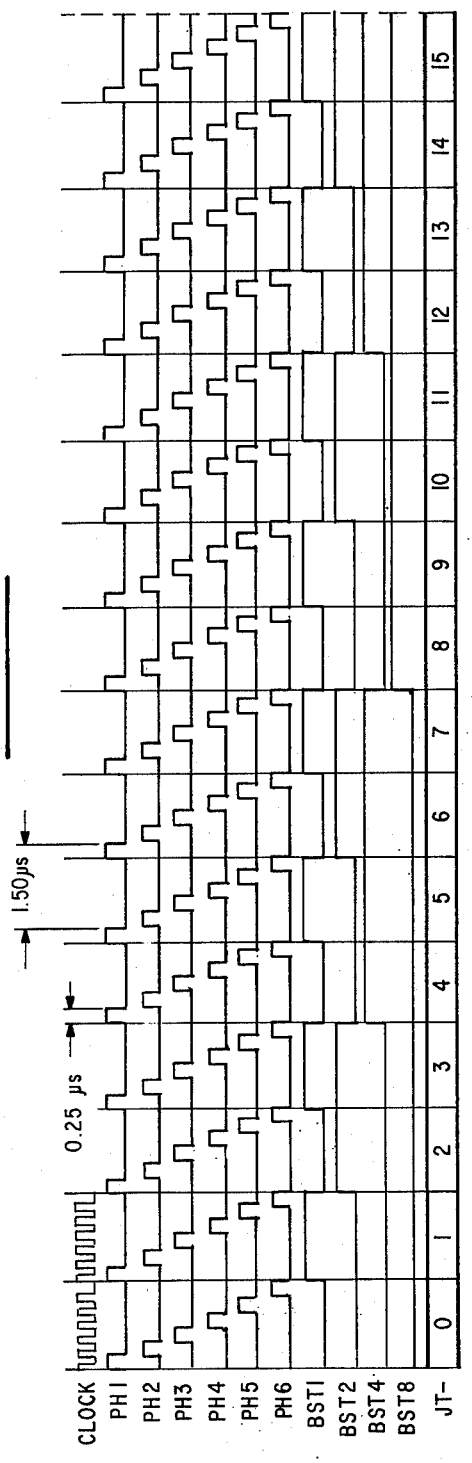
Figure 2B:
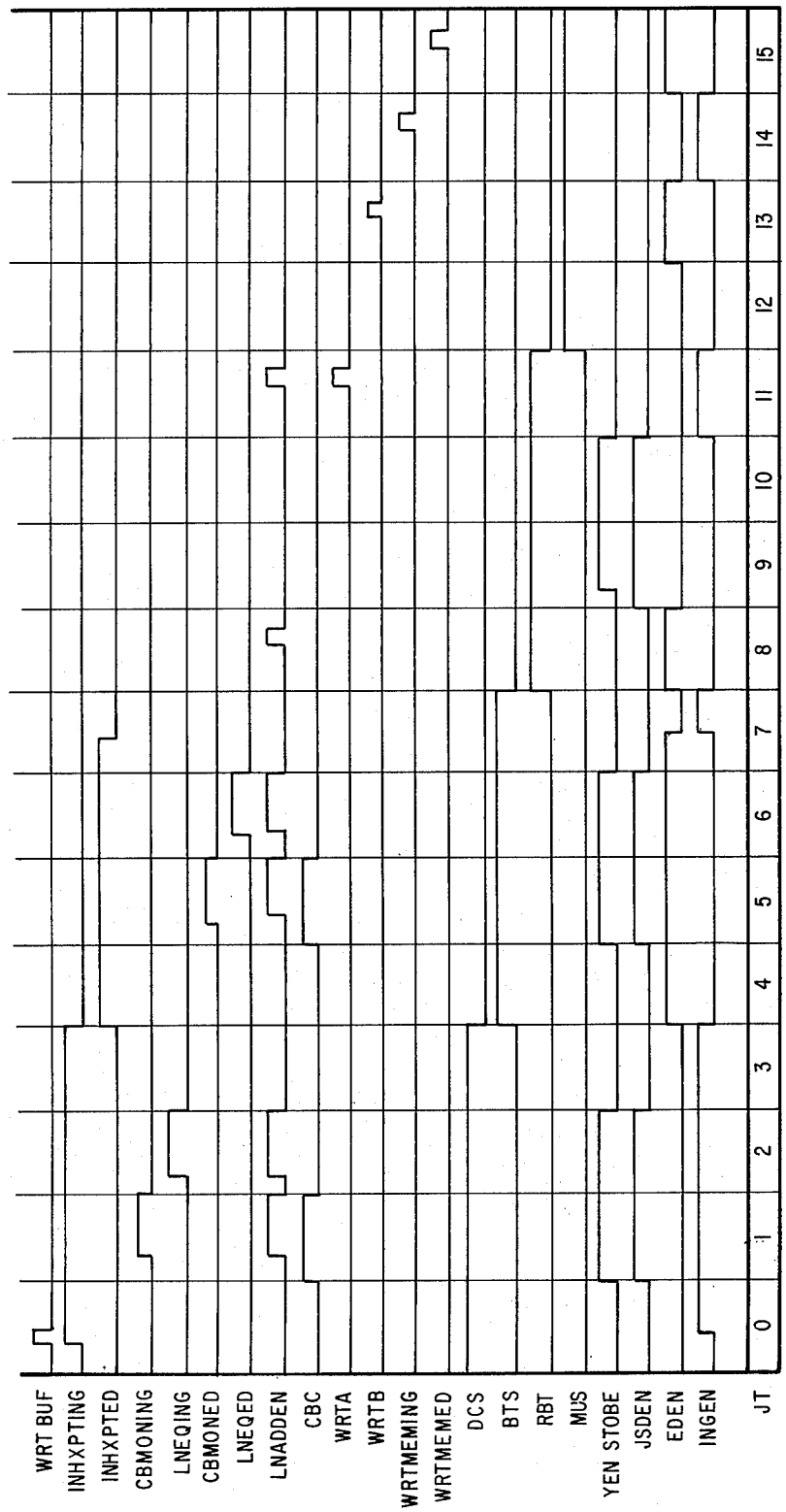

The system timing is controlled by the clock 115 in the common control 100 on the basis of various clock signals such as presented in FIGS. 2A through 2C. Typically, the clock 115 includes a 4 MHz crystal oscillator connected to a divider chain and various decoder to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the embodiment disclosed, thirty-two junctors are connected to the output of the matrix 10, so that the junctor memory 140 will include thirty-two junctor time positions. In addition, the junctor memory 140 also includes time positions 32 and 33 which represent time periods during which a scanning of the lines is effected. Thus, after all junctors have been scanned, the line number designated by the line scanner 130 will be addressed during the time positions thirty-two and thirty-three to determine whether there is a request for service in connection with that line. At the end of each 32 time positions, the line scanner 130 will be advanced to the next line, with the result that the lines are scanned one at a time at the end of each complete scan of the junctors.

Each junctor time position is subdivided into junctor time slots during which the various functions required in connection with the call associated with the particular junctor are performed under control of the control circuit 110. During one or more of the time slots of each junctor time position, one or more functions may be performed by various elements of the common control as required by the state of the particular call which is under the control of the control circuits.

FIG. 2A illustrates the output of a 4 MHz crystal oscillator (defining a portion of the clock 115) from which a plurality of phase signals PH1 through PH6 are derived by a clock phase generator producing a division of six of the basic frequency. The output of the clock phase generator is connected to a bit time slot counter which effects a division by sixteen to produce the binary bit time slot signals BTS1 through BTS8. A decoding of the four bit binary time slot signal produces the sixteen junctor time slot signals JT0 through JT15.

Further decoding of the binary bit time slot signals BTS1 through BTS8 also produces various timing signals which are utilized throughout the system. Those timing signals which will be utilized in the various common control circuits to be described below are illustrated in FIG. 2B in relation to the sixteen junctor time slot signals JT0 through JT15. The function of these timing signals will be described in connection with the description of the detailed operation of the various common control elements.

FIG. 2C illustrates the waveforms which are derived from the junctor scanner portion of the clock 115. A further division by thirty-four produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals, JCT32 and JCT33.

THE STATUS CIRCUIT

The status circuit 160 (see FIG. 1B) basically forms a memory including a storage position for each of the junctors to store the state of the call associated with each of the junctors. As already indicated in the general system description, the common control 100 steps progressively through various states during which various operations are performed under control of the control circuits 110 to perform the functions required by the system. To determine what functions need to be performed during each junctor scan, the control circuits 110 determine from the status circuit 160 the state of the call associated with the junctor. As the functions associated with each state are completed, the control circuits 110 advance the status circuit 160 to the next state for the particular junctor involved so that a continuous record of the state of the call associated with each junctor is maintained without the status circuit.

Figure 5:
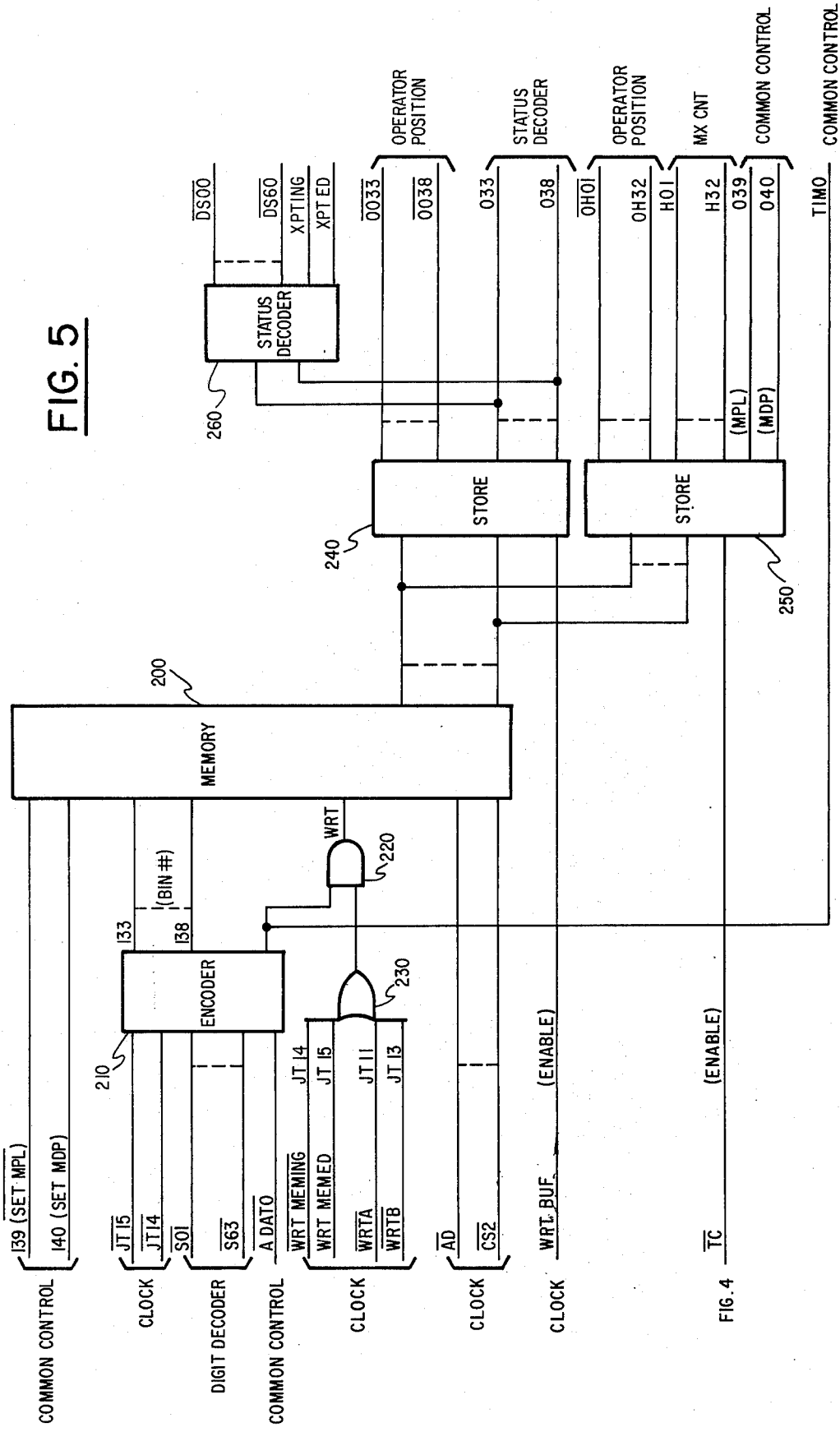
FIG. 5 is a schematic block diagram of the status circuit shown in FIG. 1B.

In the status circuit, the memory 200 FIG. 5 includes thirty-four junctor positions for the junctors JCT0 through JCT31 as well as the junctor times JCT32 and JCT33. The status of the call associated with each junctor is stored in the junctor times of the memory 200 in binary form, and therefore, an encoder 210 is provided to receive from the control circuits 110 the status signals S01 through S63 and provide the binary equivalents thereof on output lines I33 through I38 to the memory 200. Certain of the status signals S01 through S63 are time shared at the input to the encoder 210 under control of the clock signals JT15 and JT14 from the clock 115. A further input to the encoder 210 from the control circuits 110 is the signal A DAT O indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230. The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs 133 through 138 from the encoder, the memory 200 also receives direct codes of states I39 and I40 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals OH01 through OH32 are applied to the operator complex, while the signals H01 through H32 are applied to the matrix control. The signal O39 and O40, which are direct codes of status, are applied to the control circuits 110.

A time zero signal TIMO is derived from the encoder 210 to indicate to the timer each time a state changes in connection with a given junctor so that the timing functions performed by the timer may be reset to zero.

JUNCTOR MEMORY

The junctor memory 140 (see FIG. 3) includes an ING and ED write command logic circuit 300 which receives various command signals from the control circuits 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold registers 135 on binary inputs HU1 throuh HH2, from the line selector 155 on binary inputs LSU1 through LSH2, and from the digit decoder 150 on binary inputs DDU1 through DDH2. In accordance with the commands applied to the logic circuit 300, the line numbers from the hold register 135, line selector 155, and digit decoder 150 are gated to the memory 320 on leads I1 through I10 and stored in the memory 320 upon generation of the write command signal WRT from the logic circuit 300.

The commands received from the operator and the control circuits 110 relate to the storing of the called and calling numbers in the proper location of each junctor portion of the memory. The command $\overline{\text{OING}}$ $\overline{\text{(H-ING)}}$ indicates that the calling number from the hold register 135 is to be stored in the ING number location of the junctor portion of the memory 320. Similarly, the command $\overline{\text{OING}}$ $\overline{\text{(H-ED)}}$ indicates that the called number from the hold register 135 is to be stored in the ING location associated with the attendant junctor. The command $\overline{\text{ING}}$ $\overline{\text{(O+ED)}}$ indicates placing the ED number from the operator in the ING register. The command $\overline{\text{ED}}$ $\overline{\text{(O+ED)}}$ indicates a request to place the ED number from the operator in the called portion of the memory. The command $\overline{\text{ING}}$ $\overline{\text{(LN+DI)}}$ indicates that the line number from the buffer is to be placed in the calling portion of the memory 320. The command $\overline{\text{ING}}$ $\overline{\text{(H-ED)}}$ indicates that the called number from the hold register 135 is to be placed in the calling portion of the memory 320. The command $\overline{\text{ED}}$ $\overline{\text{(DGT DCD)}}$ indicates that the number from the digit decoder 155 is to be placed in the called portion of the memory 320. The command $\overline{\text{ED}}$ $\overline{\text{(B-ING + ED)}}$ indicates that the calling and called line numbers from the buffer 330 are to be inserted in the called portion of the memory. The command $\overline{\text{ED}}$ $\overline{\text{(H-ING + ED)}}$ indicates a request that the calling and called numbers from the hold register 135 are to be placed in the called portion of the memory 140. The command $\overline{\text{ING}}$ (O) indicates that the number in the calling portion of the memory 140 is to be zeroed. The command $\overline{\text{ED}}$(O) indicates that the number in the called portion of the memory 140 is to be zeroed. The command $\overline{\text{ADAT}}$ (O) indicates that all data is to be zeroed.

The signals from the clock 115 represent the various junctor time slots during which the various commands are to be executed. The clock also provides the binary signals A0 through A3, CS1 and CS2 which represent the memory addresses of the junctor portion correponding to the junctor times JCT0 through JCT32. These junctor signals control the circulation of the data within the memory 320 so that in combination with the junctor time slots applied from the clock to the logic circuit 300, the data will be inserted into the proper junctor portion of the memory 320 during the proper time.

The output of the memory 320 is provided on leads 01 through 022 to a buffer store 330, which provides binary outputs 01 through 010 representing the calling number and binary outputs 013 through 022 representing the called number to the line selector 155. A further output ING PRES to the control circuits 110 indicates that the calling number is present and the output O RING PRES to the operator complex indicates that the calling number is present in the memory poriton assigned to the attendant junctor.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

Figure 4:
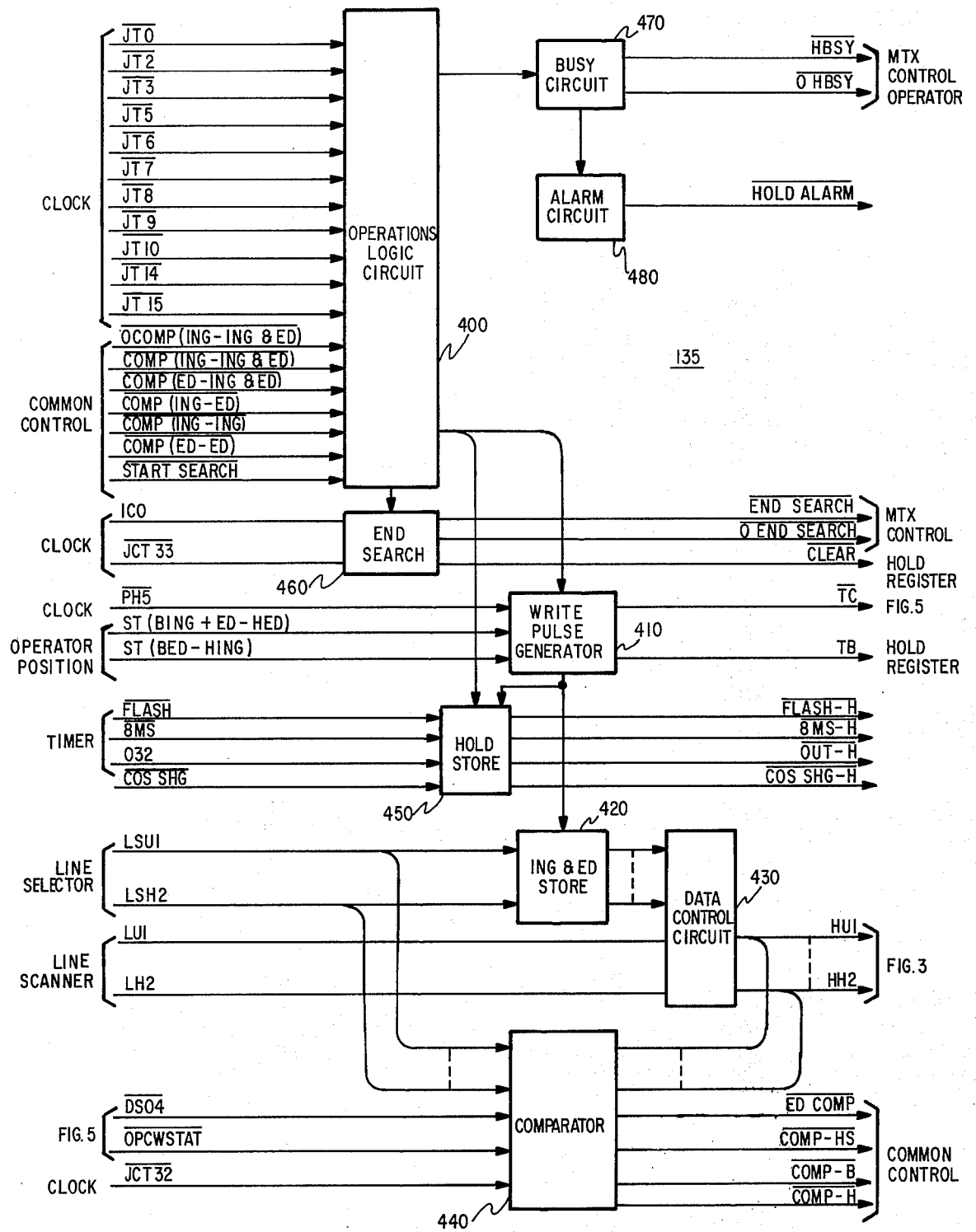
FIG. 4 is a schematic block diagram of the hold reigster shown in FIG. 1B.

The hold register 135 (see FIG. 4) serves as a temporary memory for calling and called line numbers and other data generated within the common control 100 for use in controlling the functions required in establishing and maintaining a communication connection in the system. The hold register 135 also performs various comparison functions between line numbers, for example, in conjunction with busy searches, line scanning and other functions where a particular calling or called line number is to be compared with the calling and called line number stored in the junctor memory 140.

The functions of the hold register are initiated upon receipt of a comparison request signal or a start search signal from the operator or control circuits 110 in the common control 100. The comparison requests signals and the start search signal are applied to an operations logic circuit 400 along with junctor time slot signals JT0 through JT15 from the clock 115. The comparison request commands include the command $\overline{OCOMP}$ $\overline{(ING-ING\ and\ ED)}$ indicating a request for comparison of the ING number from the attendant's junctor with all ING and ED numbers stored in the junctor memory. The command $\overline{COMP\ (ING-ING\ and\ ED)}$ indicates a request for a comparison of an ING number with all ING and ED numbers of the junctors other than the attendant junctor 80. The command $\overline{COMP\ (ED-\lambda}$ $\overline{ING\ and\ ED)}$ indicates a request for comparison of a called number with all calling and called numbers stored in the junctor memory. The command $\overline{COMP}$ $\overline{(ING-ED)}$ indicates a request for comparison of a calling number to all called numbers. The command COMP (ING—ING) indicates a request for comparing a calling number to all calling numbers stored in the junctor memory. The command COMP (ED—ED) indicates a request to compare a called number with all called numbers stored in the junctor memory.

The various comparison requests are acted upon during various junctor time slots by the operations logic circuit and result in enabling of a write pulse generator 410, which in turn enables a hold store 450 and an ING and ED store 420. The hold store 450 receives various data relating to flashes, time-outs, whether the calls is an incoming or outgoing call, a designation of the station hunting group, etc., for use by various elements of the common control 100 during the course of the following operations.

The ING and ED store 420 in the hold register 135 stores the calling and/or the called line number associated with a particular junctor as received from the line selector on binary inputs LSU1 through LSH2. For example, if the hole register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ING and ED store 420. The numbers stored in the ING and ED store 420 is then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. Such a comparison, for example, would form part of the busy search where the system attempts to determine whether a called line is busy by scanning all of the junctor positions in the junctor memory to determine whether the line circuit has its number stored in connection with any other junctor. In this case, the status decoder forming part of the status circuit 160 would provide a signal $\overline{DS04}$ to the comparator 440 enabling the comparison of the numbers stored in the ING and ED store 420 with all numbers received from the line selector 155.

Other comparisons which are performed within the hold register relate to the scanning of the lines by the line scanner 130. At the end of each junctor 32 time position, the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control circuits in the common control 100 for various functions. The output $\overline{ED-COMP}$ indicates that only a comparison of the called number has been detected. The outputs COMP—HS and COMP—H indicates a general comparison detected. The output COMP—B indicates that a comparison of a line with its own number has been detected.

The data control circuit 430 merely serves to multiplex the data which is to be applied to the comparator so as to avoid interference between comparisons associated with data stored in the ING and ED store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (B ING-+ED−H ED) is a request to store the calling and called numbers from the buffer in the junctor memory in the called portion of the ING and ED store of the hole register. The signal ST (B ED−H ING) indicates a request to store the called number from the buffer in the junctor memory in the calling portion of the ING and ED store 420 of the hold register. Such transfers of information from one junctor to the other are necessary for various operations and require a holding of this information between junctor scan times so that the transfer from one junctor position to another junctor position in the junctor memory can be effected. This is accomplished in the ING and ED store 420 under control of the write pulse generator 410. The outputs TB and TC provide indications of the transfer operations and trunk consultations, respectively.

The hold register 135 also includes an end search circuit 460 connected to the operations logic circuit 400 and receiving the control signal IC0 and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{\text{END SEARCH}}$ and $\overline{\text{0 END SEARCH}}$ are generated along with a $\overline{\text{CLEAR}}$ signal to effect control of various elements in the common control 100 at the end of the search.

The hold register 135 also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{\text{HBSY}}$ and $\overline{\text{0 HBSY}}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{\text{HOLD ALARM}}$ is generated from the alarm circuit 480.

TRUNK TRANSFER FLOW CHART

The operation of the trunk consultation arrangement will now be more fully explained by reference to the system status system diagram in FIG. 6.

Figure 6:
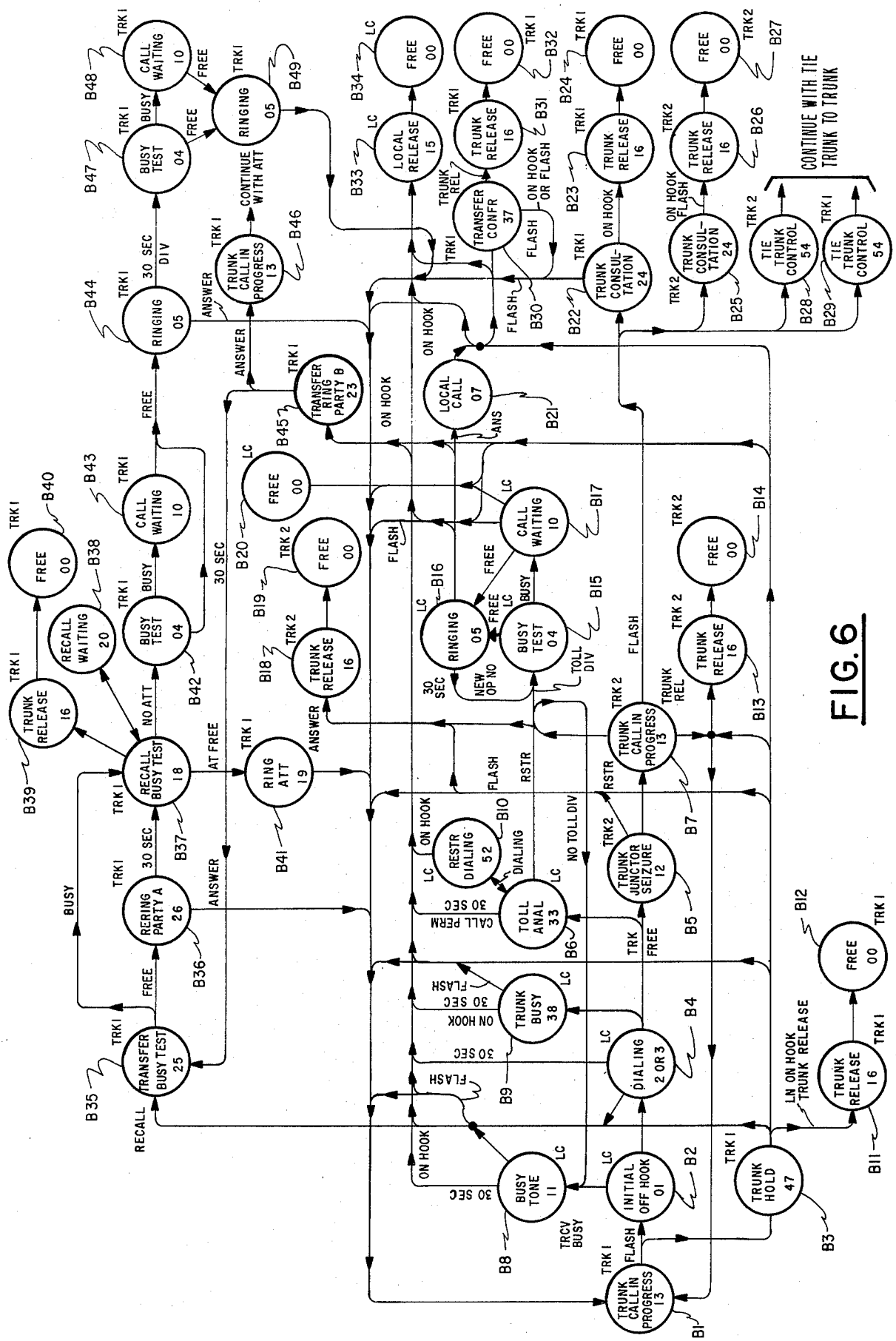
FIG. 6 is a status diagram illustrating the progression of the system through a trunk consultation operation.

Each state that the system arrangement progresses through is illustrated in FIG. 6 by a status block containing the status number used in the system. The blocks are differentiated by a legend near them indicating whether a first trunk junctor TRK1, a second trunk junctor TRK2 or a local junctor LC is in the status shown in the block.

The trunk consultation operation is initiated from a first trunk junctor TRK1 which has trunk call in progress status 13 stored therein (block B1). The first trunk junctor TRK1 may be servicing either an incoming or outgoing trunk call, including a tie trunk call. The PABX station (consulting party) connected in the established trunk call has its identity stored in the junctor memory associated with TRK1. For an outgoing trunk call the identity is stored in the ING Portion of the junctor memory and for an incoming trunk call in the ED portion of the junctor memory.

The trunk consultation operation then is initiated with a hookflash by the consulting party (the local station connected to the trunk caller) and the first trunk junctor, TRK1, is placed in a trunk holding status 47 (block B3) while a free local junctor is searched for and, when found, the free local junctor is advanced to an initial off-hook status of 1 (block B2).

The (ING or ED) position of identity of the consulting party in the memory associated with the trunk junctor TRK1 in unchanged retaining the differentiation of an incoming or outgoing trunk call. The consulting party identity is forwarded to the local junctor LC that has been seized and is stored in the ING portion of the junctor memory associated therewith. The consulting party has become the calling party in the local junctor LC and may now signal the intended consulted party of the consultation.

The consulting party receives dial tone in the local junctor and may dial - either in dial pulsing status 2 or in multifrequency dialing status 3 (block B4). If the consulted party is found free, a trunk junctor seizure status 12 (block B5) is initiated for a second trunk junctor, TRK2, associated with the consulted party and, when found, the consulting party is connected to the consulted party via the second trunk junctor TRK2 by a trunk call in progress status 13 (block B7). The consulting party and consulted party are now connected independently of the held trunk party and may consult without interference.

A second hookflash by the consulting party produces a trunk consultation status 24 in both trunk junctors TRK1, and TRK2 (blocks B22 and B25, respectively), where the three parties consult similarly to a three-way conference. The three-way trunk consultation is formed by the trunk junctors TRK1 and TRK2 sharing the PABX station (consulting party) as a common connection. The crosspoints associated with the consulting party and each trunk junctor TRK1 and TRK2 are closed to provide the conference path. The second trunk junctor TRK2 retains the identity of the consulting party in the ING portion of its associated memory and the first trunk junctor TRK1 retains the differentiation between an incoming and outgoing trunk call. If the original trunk call was outgoing, the first trunk junctor TRK1 also has the consulting party identity stored in the ED portion of the memory. This action is to permit one memory position associated with the junctor TRK1 to be the controlling position of the trunk release (ED party in this case) of both junctors TRK1 and TRK2.

A third hookflash from the consulting party releases the second trunk junctor TRK2 (consulted party) from the conference, produces a trunk release status 16 and a free status 0 (blocks B26 and B27, respectively) for trunk junctor TRK2, and returns the trunk junctor TRK1 (consulting party) to the original trunk call in progress status 13 (block B1). If, however, the consulting party goes on-hook, both trunk junctors will be released (blocks B23 and B26, respectively), and finally freed (blocks B24 and B27, respectively), since two central office trunks are not permitted to remain in tandem for the PABX system. This allows the trunk consultation feature to remain under local party control.

A different result occurs if one of the trunks participating in the consultation operation is a tie trunk. In this case, the trunk junctors TRK1 and TRK2 are placed in a tie trunk control status 54 (blocks B28 and B29, respectively), upon the second hookflash command for the three-way conference and the call continues under the control of a tie trunk operation. In this arrangement, two tie trunks or a tie trunk and a CO trunk may be left tandemed in the PABX system.

The trunk consultation arrangement provides a plurality of other alternative logical sequence through which the consulting party may progress in response to differing circumstances. If, during the initial off-hook status 1 in the local junctor LC (block B2), the tone receiver is busy and the system is unable to provide dial tone to the consulting party, the local junctor is placed in a busy tone status 11 (block B8). The consulting party then has the option of going on-hook or hookflashing. If neither action is taken within 30 seconds, the local junctor is advanced to the local release status 15 (block B33) and thereupon to the free status 0 (block B34) and the consulting party is locked out from further action in the local junctor LC.

An on-hook signal from the consulting party with the local junctor in busy tone status 11 produces a transfer busy test status (block B35), thereby starting a recall loop to call the consulting party. The recall loop will be more fully explained hereinafter. Alternatively, if the consulting party hookflashes he is returned to the original trunk junctor TRK1 which is advanced to a trunk call in progress status 13 (block B1). Additionally, both the on-hook and the flash indications from the consulting party during the busy tone status 11 for the local junctor LC produces a release of that junctor via the local release status 15 (block B33) and the free status 00 (block B34).

If, during dialing, in status 2 or 3 (block B4), the consulting party, connected to the local junctor LC, stops dialing, he is locked out after 30 seconds and again the local junctor is released. Alternatively, the consulting party may hookflash or go on-hook as he did in response to the busy tone status 11. An on-hook condition transfers the trunk junctor to a transfer busy test status 25 (block B35) and a hookflash returns the trunk junctor TRK1 to a trunk call in progress status 13 (block B1). In either case, the local junctor is released (block B33) and freed (block B34) is described above.

If, while dialing the consulted party (block B4), the trunk that is to be seized is busy, a trunk busy status 38 is placed in the memory associated with local junctor (block B9). The consulting party then may either go on-hook or hookflash. If no action is taken within 30 seconds, the local junctor is released and freed (blocks B33 and B34). A hookflash results in the same operation that was described for the busy tone status 11 or the dialing status 2 or 3. However, an on-hook signal from the consulting party causes release (block B33) of the trunk TRK1.

If the trunk TRK2 is free, the local junctor is advanced to a toll analysis status 33 (block B6) to determine whether the consulting party may legitimately dial the trunk party he wishes to consult. The status of the local junctor alternates between the toll restriction analysis and the restricted dialing status 52 (block B10) until a decision is made whether the call is restricted or permitted. If the call is permitted the local junctor is released (block B33) and finally freed (block B34) and the second trunk junctor TRK2 is advanced to the trunk junctor seizure status 12 (block B5). If, during the restricted dialing status 52 the consulting party goes on-hook or takes longer than 30 seconds to dial, the local junctor is advanced to a local release status 15 (block B33) and a free status 0 (block B34). During the status 52, a hookflash by the consulting party releases the second trunk junctor TRK2 (block B18) which is then freed (block B19) and returns the first trunk junctor TRK1 to trunk call in progress status 13 (block B1).

If it is determined in the restriction analysis, that the call is to be restricted, the system proceeds to determine whether the PABX is provided with a toll diversion arrangement. If a toll diversion facility is not provided for in the system, the busy tone status 11 is placed in the local junctor (block B8). With the local junctor LC in the busy tone status 1, the consulting party has the options described above. If the call has been indicated as restricted, the trunk junctor TRK2 which is in the trunk call in progress status 13 (block B7) is released via the trunk release status 16 (block B18) and freed (block B19).

The toll diversion feature allows an operator or attendant number to be accessed by the busy test status 4 (block B15). If the operator is busy, the call waiting status 10 (block B17) continues to call the number until it is free. The status of the local junctor is then advanced to the ringing status 5 (block B16) in which the local junctor LC is used to ring the operator number. If the ringing is not answered within 30 seconds a new operator number is accessed via the busy test (block B15) and the procedure is repeated until an operator answers or the consulting party returns on-hook.

When the attendant answers, the local call in progress status 7 is placed in the local junctor LC (block B21) allowing the operator and the consulting party to converse concerning the toll restriction.

If during the time the consulting party and the operator are in a local call status 7 (block B21), the operator or the consulting party returns on-hook, the local junctor is released (blocks B33 and B34) and the consulting party is returned to the first trunk junctor TRK1 and a trunk call in progress status 13 (block B1).

If the consulting party hookflashes during the time the local junctor is in the call waiting status 10 (block B17) or the ringing status 5 (block B16), he is returned to the original trunk call (block B1) and the trunk junctor TRK1. An on-hook signal by the consulting party during the call waiting status 10 (block B17) also results in the consulting party's being returned to the first trunk junctor TRK1 (block B1). However, if the consulting party goes on-hook during the toll diversion or the ringing of the operator (block B16), the trunk party connected to the trunk junctor TRK1 is forwarded to the transfer ring party B status 23 (block B45). This action produces a transfer of the held trunk party to the attendant via the first trunk junctor TRK1.

When the operator answers the ringing signal, the status of trunk junctor TRK1 changes to a trunk call in progress status 13 between the attendant and the held trunk party. The call may now continue as an attendant call. If the operator does not answer within 30 seconds, the trunk junctor TRK1 is forwarded to the transfer busy test status 25 (block B35) where the consulting party will be recalled as will be more fully explained below.

A transfer conference status 37 (block B30) in which the held trunk party connected to the trunk junctor TRK1, the operator and the consulting party may confer, may be initiated during the local call in progress status 7 (block B21) by a hookflash by the consulting party. If a trunk release occurs during the three-way conference connection, the trunk junctor TRK1 is advanced to the trunk release status 16 (block B31) and the free status 0 (block B33). Alternatively, an on-hook signal or flash signal by the consulting party while the trunk junctor TRK1 is in the transfer conference status 37 returns the trunk junctor TRK1 to the trunk call in progress status 13 (block B1) and drops the attendant from the conversation.

As described above, a special recall loop is provided when either the attendant does not answer after 30 seconds (during status 23 transfer ring party B), or when the consulting line has gone on-hook (during the busy tone status 11 or during dialing status 2 and 3). Thus a transfer busy test status 25 (block B35) is placed in the portion of the memory associated with the trunk junctor TRK1 and the arrangement subsequently searches the ING and ED memory to test the busy-idle status of the consulting PABX line. If the consulting line is free, it is signaled from the trunk junctor TRK1 by a re-ring party A status 26 (block B36).

If the original consulting PABX party answers, the system again advances the trunk junctor TRK1 to a trunk call (between the consulting and the held trunk party) in progress status 13 (block B1). If, however, the consulting line is busy or the consulting line does not answer within 30 seconds during the transfer busy test status 25 (block B35) or during the re-ring party A status 26 (block B36), a recall busy test status 18 (block B37) is placed in the trunk junctor status memory associated with the first junctor TRK1. Subsequently, the recall test status 18 provides for a called diversion to an attendant's line or to a previously programmed designated station. If the attendant line is the line that was originally called (consulting PABX station) and the attendant line is idle, the trunk junctor TRK1 is placed into a ringing attendant's status 19 (block B41) and the call proceeds to a trunk call in progress status 13 (block B1) when the attendant answers. If the attendant line is the consulting line and is busy in the recall busy test status 18 (block B37), a trunk junctor TRK1 progresses to a recall waiting status 20 (block B38) and the status is alternated between the recall waiting status 20 and the busy test status 18 until the attendant line becomes idle at that time, the trunk junctor TRK1 progresses to the ringing attendant status 19 (block B41). A trunk release during the recall busy test 18 for the trunk junctor TRK1 results in a trunk release (block B39) and finally a free status 0 (block B40).

If the consulting line is not the attendant line, the system diverts the call to the station attended line and a busy test status 4 (block B42). If the station attendant line is free, the trunk junctor TRK1 proceeds to a ringing status 5 (block B43) and, when the station attendant answers the trunk call in progress status 13 (block B1). If the station attendant line is busy when the trunk junctor TRK1 is placed in the busy test status 4 (block B42), the trunk junctor TRK1 is advanced into a call waiting status 10 (block B43) and the busy-idle status of the station attendant is periodically checked. When the station attendant line subsequently becomes free, the ringing status 5 (block B44) is placed in the trunk junctor status memory and the call proceeds as described above. However, if after 30 seconds of ringing there is no answer at the station attendant's line, the pre-programmed number of another designated station is placed in the trunk junctor memory. A busy test is now performed on the pre-programmed number (block B47) and, if it is idle, that station is signaled via a ringing status 5 (block B49). If the designated station is busy, the trunk junctor TRK1 is advanced to the call waiting status 10 (block B48) and alternates between the busy test status and the call waiting status. When the diverted to designated station answers a trunk call in progress status 13 is placed in the trunk junctor TRK1.

From the foregoing detailed description it is apparent that many of the functions of the trunk consultation operation are identical to that of the trunk transfer operation described in the above cross-referenced application. Additionally, circuitry common to other system functions has been utilized to effect portions of the special feature of trunk consultation.

Accordingly, the local junctor release (blocks B20, B33 and B34) and the trunk junctor release (blocks B11, B12, B13, B14, B18, B19, B23, B24, B26, B27, B31 and B32) are features shared in common in the system. The toll analysis operations (blocks B9, B6 and B10) are provided by common circuitry for all outgoing trunk calls in the system.

The trunk transfer feature circuitry is used to perform the progression from block B1 to B2 and B3 of the trunk consultation flow chart. Additional trunk transfer circuitry is used for the system progression illustrated in blocks B4, B8, B15-B17, B21 and B30, as more fully described in the cross-referenced application, the disclosure of which has been incorporated herein by reference.

Figure 7A:
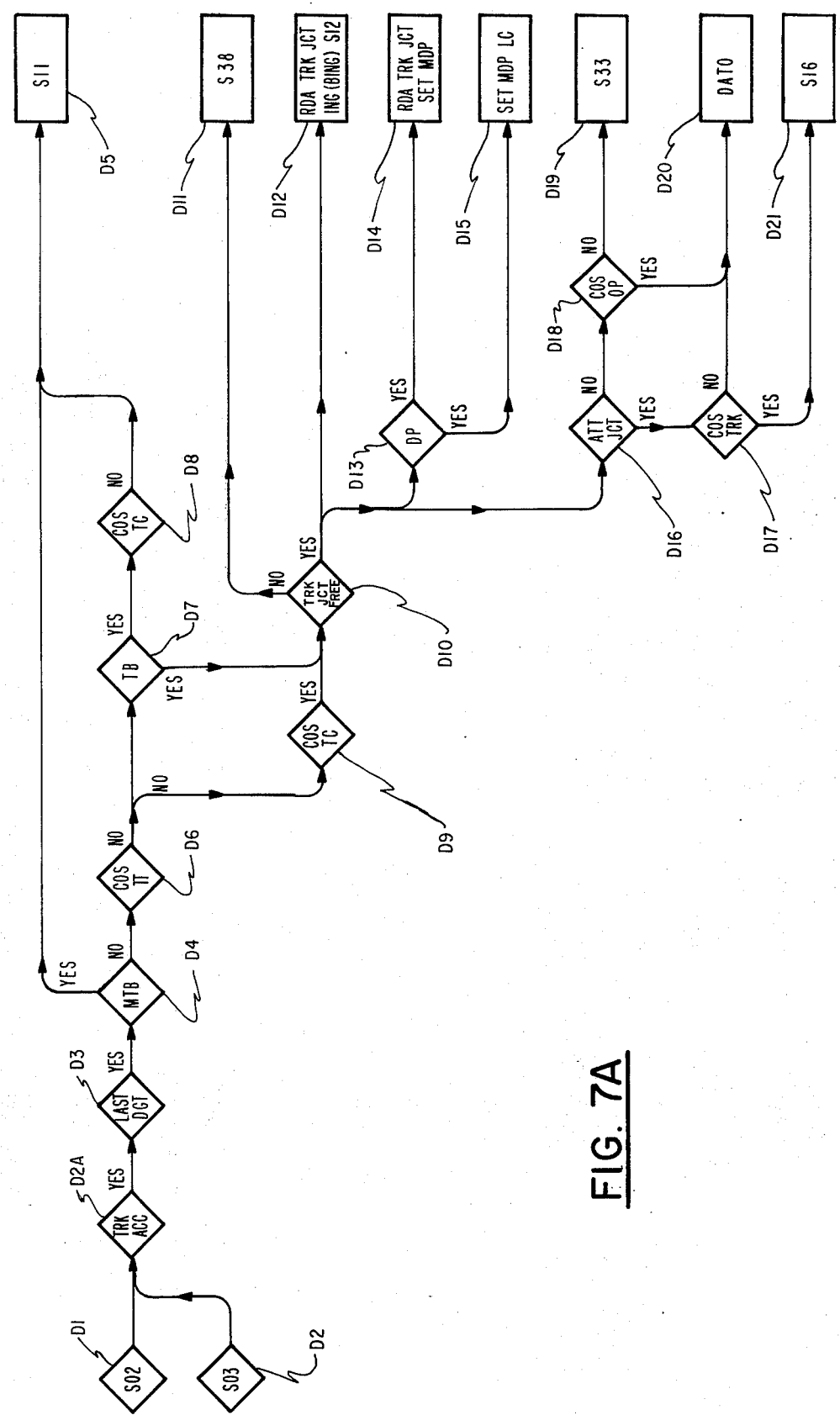
FIGS. 7A-C are the decisional sequences performed during the status progression in FIG. 6.
Figure 7B:
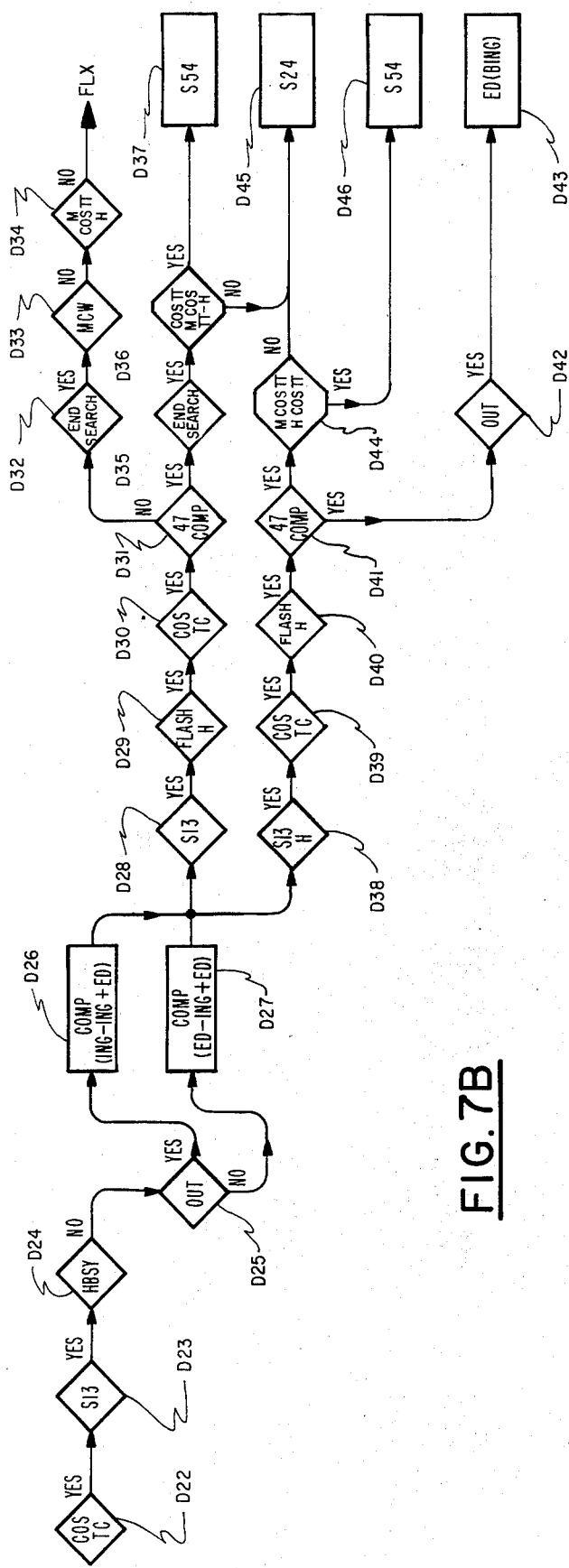
Figure 7C:
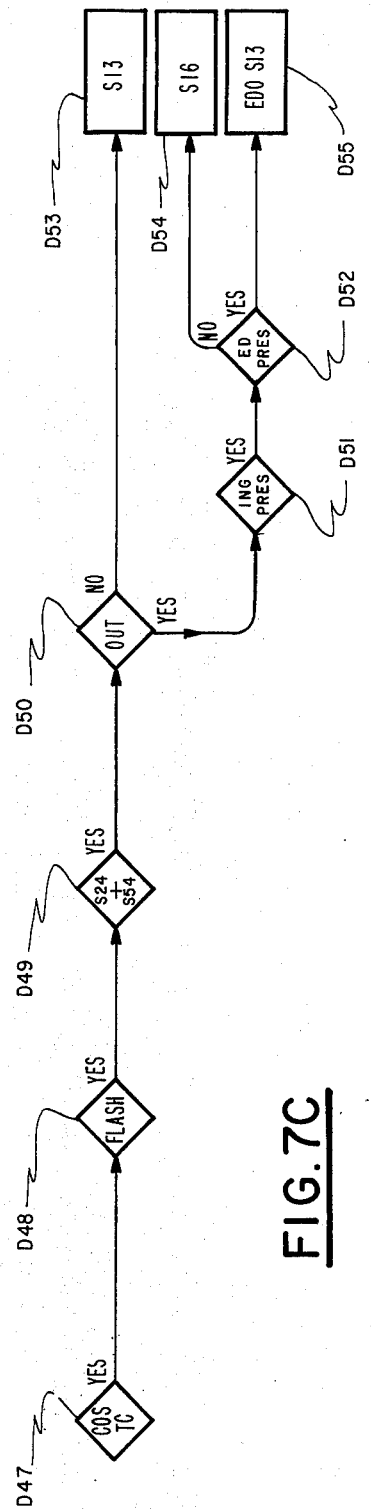

The recall loop (B35-B49) also is provided by the trunk transfer circuitry described in the cross-referenced application (and more fully described on Pages 37–38 and FIGS. 7C, K and L of that reference).

The basic flow chart of the trunk consultation operation will now be more fully described with reference to the functional diagrams 7A through 7C, which illustrate the progression of the system between statuses and with reference to schematic logic wiring diagrams (FIGS. 8A through 8C), which are arranged to implement the functions shown in the functional diagram. The functional diagrams, FIGS. 7A through 7C, illustrates the additional progressions, in addition to those performed by the system trunk transfer circuitry required to perform the trunk consultation operations.

FIG. 7A shows the progress of a call from the dialing status 2 or 3 to the busy tone status 11, the toll analysis status 33, the trunk busy status 38, the local release data 0, and the trunk release status 16. After a local junctor has been seized and the consulting party is dialing in status 2 or 3 (hooks D1 and D2, respectively), the system checks to determine that the consulting party has access to trunks (block D2A) and there is no restriction for outside connection. The arrangement then waits until the last digit has been dialed (block D3) before proceeding to interrogate whether the local transfer bit MTB is set in the local junctor LC the system is presently addressing. If the bit MTB is set, the local party seizing the junctor LC was starting from a local transfer operation but dialed a trunk member. In this case, the path to the trunk is blocked and a busy tone status 11 (block D5) is placed in the memory associated with the local junctor. Busy tone is returned to the dialing party, informing him that the attempted dialed connection is not permitted.

If the local transfer bit has not been set (block D4), the system checks whether the dialing line has a class-of-service for tie trunk operation (block D6). If not, the system then checks for the presence of a transfer bit (block D7). If the transfer bit is set (block D7) and there is no class-of-service trunk consultation (block D8), the system determines that the party is trying to dial a trunk number from a transfer operation, which is not allowed. Therefore, busy tone status 11 is placed in the memory associated with the junctor LC and busy tone returned to the dialing party. However, if the transfer bit is set (block D7) and the line has trunk consultation class-of-service (block D9) the arrangement proceeds to attempt to seize the trunk junctor addressed (consulted party).

If the trunk junctor is not found free (block D10), the system progresses into the trunk busy status 38 for the local junctor LC (block D11). If the trunk junctor is free (block D10), three operations occur. First, the trunk junctor is random accessed to place the calling number from the local junctor (consulting party) into the ING portion of the selected trunk junctor TRK2 and a status 12 is placed in the portion of the memory associated with the trunk junctor TRK2 to busy the trunk. Second, if the trunk requires dial pulsing (block D13) the MDP bit is set during the random access of the trunk (blocks D14 and D15). Simultaneously, the system (block D16) checks to see if the junctor addressed (local junctor) is an attendant junctor. If it is not, the system checks the consulting line for an operator class-of-service (block D18). If both indications are negative, the toll analysis status 33 is placed in the portion of the memory associated with the local junctor to perform a toll analysis on the number dialed. This is to restrict local stations to a certain area and for billing purposes in general.

If the junctor addressed was an attendant junctor (yes in block D16) no toll restriction is needed and the local junctor is released (block D20). If, however, the consulting line has a trunk class-of-service the junctor is released (block D21) by a trunk release status 16. Similarly, if the line has an operator class-of-service (block D18) there is no need for a toll restriction status 33 and the local junctor is released by a data 0 signal (block D20).

Figure 8A:
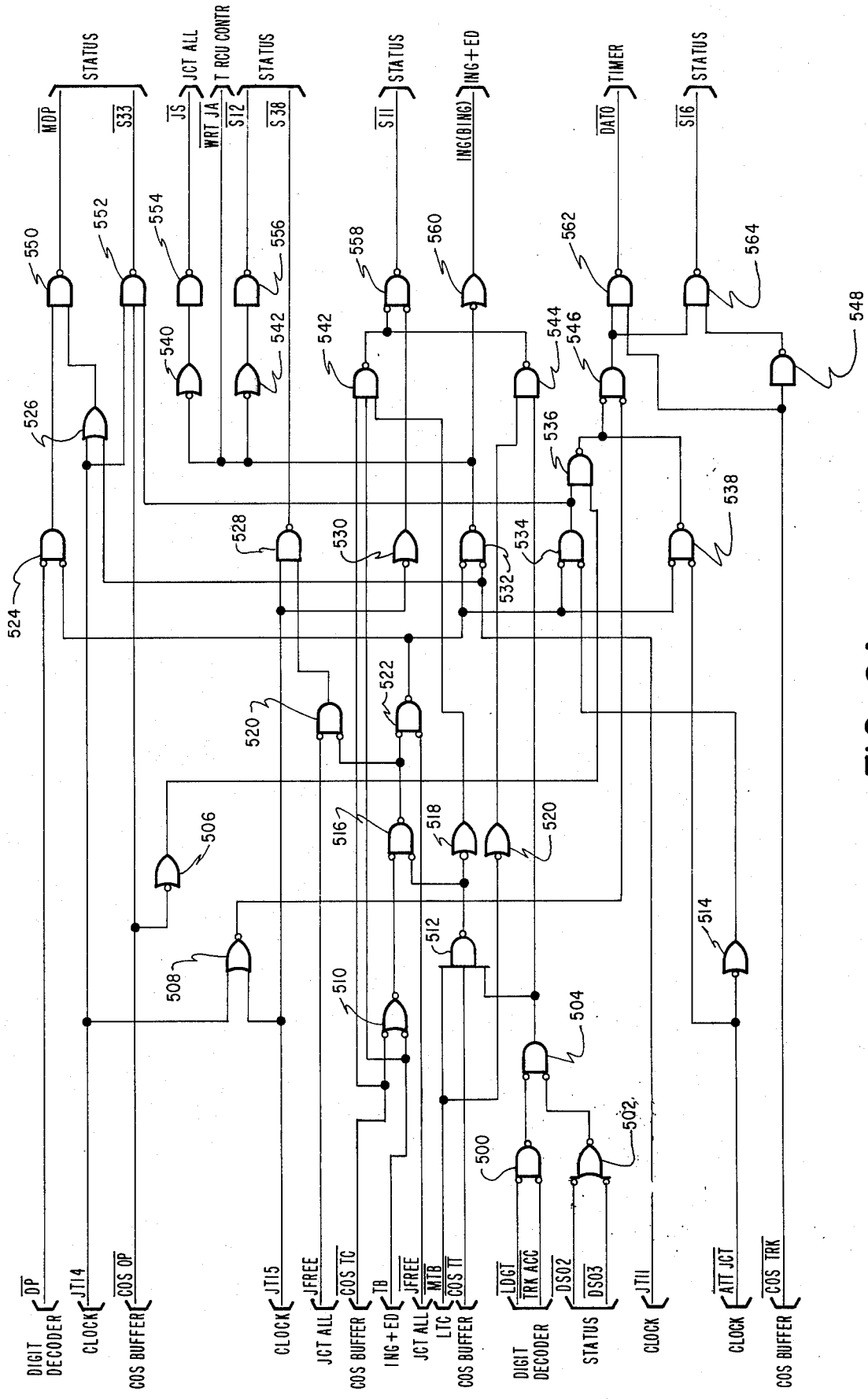
FIGS. 8A-C are detailed electronic schematic wiring diagrams of circuitry arranged to implement the decisional sequences shown in FIG. 7.

The functions illustrated in FIG. 7A are implemented by the logic circuitry shown in FIG. 8A. An OR gate 502 is arranged to be enabled by either of the signals DSO2 and DSO3 (transmitted from the status circuit) and to transmit an output signal to one input of an AND gate 504. An AND gate 500 is enabled by the coincidence of the last digit signal LDGT and the trunk access signal TRK ACC (transmitted from the digit decoder) and the output from the gate 500 enables the gate 504. When the gate 504 has an output the system has progressed up to block D3 in FIG. 7A. The output of the AND gate 504 is combined with the presence of local transfer bit signal MTB (transmitted from the memory via an inverter 520) in an AND gate 544 which is enabled and transmits an output signal to one input to an AND gate 558. The AND gate 558 is enabled by the junctor time slot signal JT15 (transmitted via an inverter 530) and transmits an output signal S11 to the status circuit (block D5 in FIG. 7A).

An AND gate 512 combines the output signal from the AND gate 504 with the absence of the MTB signal and of the class-of-service tie trunk signal, COS TT, and is enabled to transmit an output signal to one intput of an AND gate 542 (via an inverter 518) and to one input of an AND gate 516. The other input signals transmitted to the AND gate 542 are the transfer bit signal from the ING and ED memory, TB, and the signal indicating the consulting line does not have a class-of-service for trunk consultation COS TC. When the AND gate 542 senses the coincidence of these signal (which corresponds to the decision block D8 of FIG. 7A), the output signal from the AND gate 542 enables the gate 558 which generates the status 11 signal S11 during the junctor time slot JT15.

The output signal from the AND gate 512 (which corresponds to block D9 in FIG. 7A) also enables an AND gate 516 to produce a signal when the consulting line has a class-of-service for trunk consultation or the transfer bit is not set as determined by an OR gate 510 (which has input signals COS TC and TB). The output signal from the gate 516 is transmitted to one input of an AND gate 522. The other input to the AND gate 522 is the signal JFREE, which indicates that the accessed trunk junctor is free. The output signal from the AND gate 522 enables two gates, an AND gate 532 (during the junctor time slot 11) and an AND gate 524 (if the signal DP is present). The output signal from the AND gate 532 is used to select the junctor seized (via the signal JS transmitted to the junctor allotter via inverter gates 540 and 544), to write the junctor address for the trunk receiver control (via a signal WRT JA), and during the time trunk junctor is random accessed, to place a status 12 signal S12 in the status memory (via inverter gates 540 and 554).

These three signals are transmitted during the junctor time slot 11 (the signal JT11 which enables the AND gate 532). This junctor time slot 11 signal (transmitted via an OR gate 526) also enables an AND gate 550. The output signal from the gate 522 also enables an AND gate 524 whose other input is the signal DP, the presence of which indicates that the trunk, which is being random accessed during junctor time slot 11, is arranged for dial pulse signaling. The gate 524 therefore produces a high input to the gate 550 which transmits a set the dial pulsing bit signal MDP in the trunk junctor selected during the junctor time slot 11 (this corresponds to block D14 in FIG. 7A). During junctor time slot 14, after the junctor select signal JS has gone low, the gate 550 also sets the dial pulsing bit via the signal MDP, the portion of the memory associated with the local junctor.

If the trunk junctor accessed is busy, an AND gate 522 which has as one input the output signal from the gate 516 receives the JFREE signal and transmits a status 38 signal 338 to the status memory (via an AND gate 528) during junctor time slot 15. This output corresponds to the decision in block D11 in FIG. 7A.

The system may now check for the dial restriction condition, as previously described with respect to blocks D16 through D21 of FIG. 7A. The output signal from the AND gate 522 (which corresponds to a yes decision in block D10), is combined in an AND gate 534 with the signal (transmitted via an inverter 514) indicating that the junctor addressed is not the attendant junctor ATT JCT. The output signal from the gate 534 is combined with the signal COS OP in an AND gate 552 to produce a signal indicating that the operator class-of-service and the ATT JCT signals are not present.

During the AND gate 552 junctor time slot 14 is enabled and transmits the status signal S33 to the status memory to indicate that the system should perform toll restriction analysis (corresponding to block D19 in FIG. 7A). An AND gate 536 which has as one input the output signal from the AND gate 534 and as another the output signal from an inverter gate 506 is used to decide whether that there was an operator class-of-service. If so, the output signal from the gate 534 enables the gate 546 during the junctor time slot 14, JT14. The output signal from the gate 534 enables an AND gate 562 if the class-of-service trunk signal, COS TRK, is absent and the AND gate 562 transmits the data 0 signal to the timer. If the signal COS TRK is present via an inverter 548, an AND gate 564 is enabled by the signal transmitted and the output signal from the AND gate 546 and transmits the status signal S16 (corresponding to the decisional block D21 in FIG. 7A) to the status memory.

The trunk consultation progression from a status 13 trunk call in progress to a trunk consultation status 24 or to a tie trunk control status 54 will now be more fully explained with reference to the decisional flow diagram in FIG. 7B.

From the trunk call in progress status 13, the system allows the trunk call in trunk junctor TRK2 to progress to the trunk consultation status 24 or to the tie trunk control status 54 for forming a three-way trunk consultation with the consulted, consulting and held trunk parties. Additionally, a path is established for the initialization of the trunk holding status 47.

Once a hookflash by the consulting party has been detected, the system interrogates whether the consulting line has the class-of-service for trunk consultation (block D22) and whether the junctor presently addressed is in status 13. If both checks are positive, (Yes in blocks D22 and D23), the hold register is checked and if not busy (block D24) a comparison is started. Depending on which type of trunk call is being processed, incoming or outgoing (block D25) the memory is searched for the ING or the ED number (blocks D26 and D27, respectively), to find the associated junctor TRK1 which is holding the trunk party originally connected.

Once the hold register search is initiated, the system may follow one of three sequences. Assuming that the system is in the trunk call in progress status 13 (block B1), the system follows a first path beginning with the block D28.

The system then determines that the trunk junctor TRK1 is in a status 13, that a hookflash began the hold register search (block D29) and the line connected to the trunk junctor TRK1 has the trunk consultation class-of-service, COS TC (block D30). The arrangement then interrogates whether a 47 COMP signal is present in the status memory (block D31). If there is no 47 COMP signal, in other words if the trunk junctor TRK1 has not been initialized yet (block B1 of FIG. 6), the system finds that the search has ended (block D32) and the call waiting bit MCW is not set (block D33). Finally, the system determines from the class-of-service tie trunk bit stored M COS TT H (block D34) that the hold register search was not completed. An FLX signal is then transmitted to the trunk transfer circuitry to initialize the local junctor LC to an initial off-hook status 1 and to place the trunk junctor TRK1 into a status 47 trunk transfer hold. Initialization of the system by an FLX signal is more fully described in the trunk transfer application cross-referenced above, beginning on Page 39, line 14 and ending on Page 42, line 9.

An alternate sequence is followed if the system was in a trunk call in progress status 13 (block B7). The ING and ED numbers are tested (blocks D26 and D27) and a search is made for the trunk junctor TRK1 that was placed in the holding status (block B3 in FIG. 6) and has a trunk transfer hold status 47 stored in the portin of the memory associated therewith. The path for this decisional progression begins in block D38 in which the system recognizes that the hold register search was begun with a status 13, that the line flashing has a class-of-service for trunk consultation COS TC (block D36) and that the flash began the hold register search (block D30). The comparison signal 47 COMP then determines that the status 47 was stored in the memory location associated with the trunk junctor TRK1 (block D41) and the system decides whether the class-of-service tie trunk COS TT H began the hold register search or if the class-of-service tie trunk bit has been stored M COS TT (block D44).

If the answer to both of these checks is negative, the trunk junctor is placed in a status 24 (block D45 corresponding to the block B22 in FIG. 6). However, if a tie-trunk class-of-service is found, or the tie trunk bit has been stored (block D44), the system is placed in a tie trunk control status 54 which corresponds to block B29 in FIG. 6. Simultaneously with tie trunk class-of-service interrogation, the system determines whether the initial trunk call was an outgoing trunk call (block D42) and, if so, information in the ING portion of the buffer is stored in the ED portion of the trunk junctor associated with the three-way conference. As mentioned above, this permits the three-way conference trunk release to be under the control of the called party.

The system now steps through the remainder of the junctors until it addresses the trunk junctor TRK2 which began the hold register search. Again the sequence starts (block D28) by recognizing the junctor has a status 13 stored therein, that a hookflash began the hold register search (block D29) and the line has a class-of-service for trunk consultation COS TC (block D30). The 47 COMP signal is present however, for this path, and the system then determines that a signal END SEARCH has been given (block D35). Next the presence of the class-of-service tie trunk bit and whether the class-of-service tie trunk began the hold register search are checked for in block D36. If either is present, the trunk junctor is then initialized to the tie trunk control status 54, which corresponds to block B28 in FIG. 6. If neither is present, the trunk junctor is initialized to the trunk consultation status 24 (block D45) which corresponds to the block B25 in FIG. 6.

However, for this sequence the decision in block D31 is affirmative and the system then checks whether a signal END SEARCH has been transmitted (block D35). Following this decision, a check is made for the class-of-service tie trunk bit and whether the class-of-service tie trunk began the hold register search is checked for in block D36. If either check is affirmative, the trunk junctor is then initialized to the tie trunk control status 54 which corresponds to block B28 in FIG. 6. If not, the trunk junctor is initialized to the trunk consultation status 24 (block D45) which corresponds to the block B25 in FIG. 6.

Figure 8B:
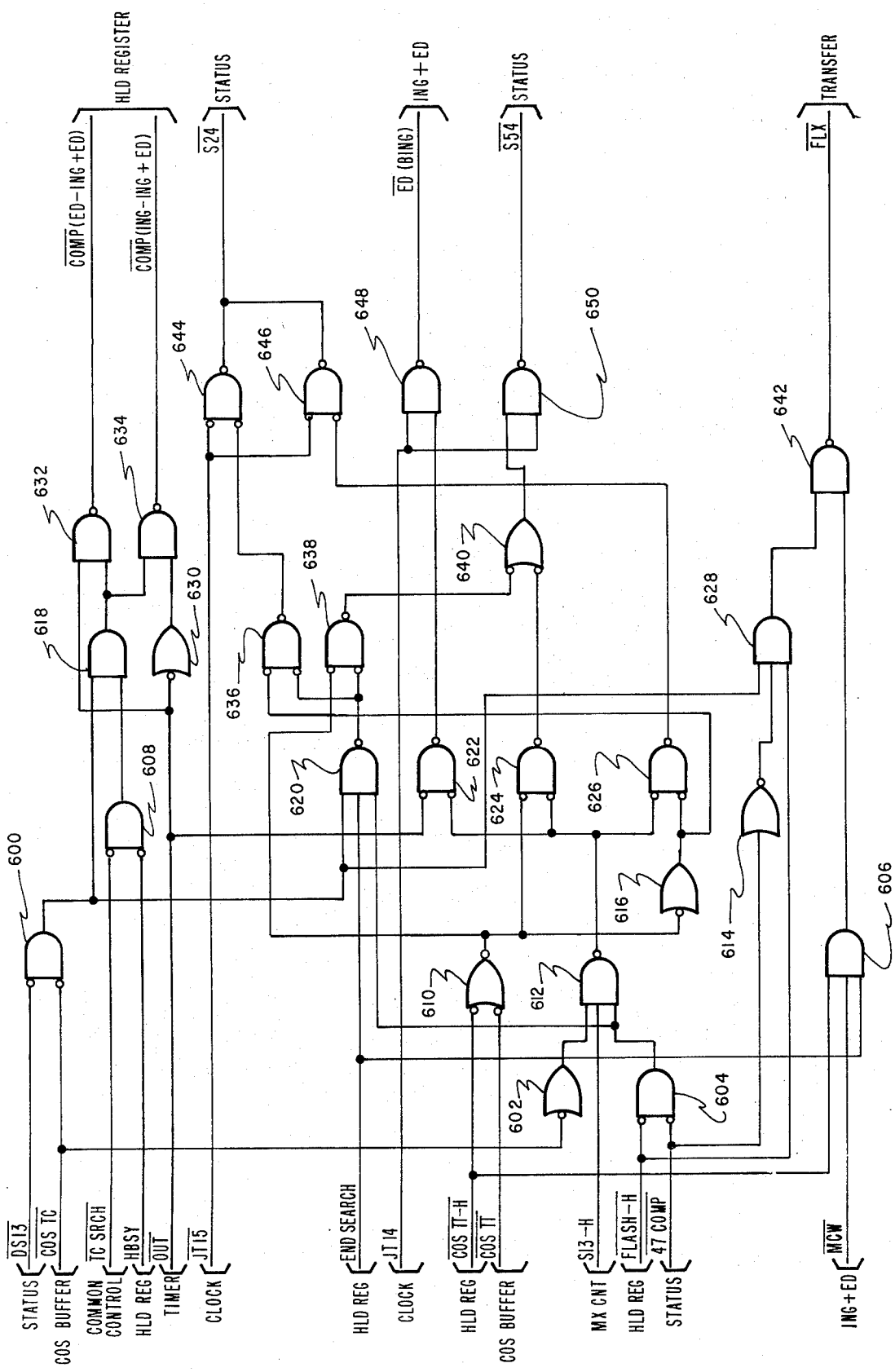

These sequences illustrated in FIG. 7B are implemented by the logic circuitry shown in FIG. 8B in which an AND gate 600 is arranged to be enabled by the combination of the trunk call in progress status signal DS13 and the trunk consultation class-of-service indicator COS-TC transmitted from the class-of-service buffer. The output signal from the AND gate 600 enables an AND gate 618 when an AND gate 608 is enabled. The AND gate 608 combines the signal HBSY (indicating that the hold register is not busy) and the signal indicating that the trunk consultation search should be started signal, TC SRCH. The output of the gate 618 therefore corresponds to the block D24 in FIG. 7B.

The output signal from the AND gate 618 is transmitted to one input each of an AND gate 632 and an AND gate 634. The AND gate 632 transmits the signal COMP (ED−ING+ED) to produce a comparison of the ED number with all ING and ED numbers in the junctor memory when enabled by the signal OUT (indicating the absence of an out bit from the timer). The gate 634 transmits the comparison signal (COMP ING-ING or ED) to compare the ING with all ING and ED numbers in the junctor memory when enabled by the presence of an out bit signal OUT (transmitted via an inverter gate 630). These two comparison signals correspond respectively to blocks D26 and D27 in FIG. 7B.

An AND gate 604 is arranged to generate an output signal after decoding the coincidence of the signal FLASH-H transmitted from the hold register and the signal 47 COMP transmitted from the status circuit. The output signals from the AND gate 604 and the AND gate 600 are transmitted to an AND gate 620 which is enabled by the END SEARCH signal transmitted from the hold register. The output of the gate 620 therefore corresponds to the decisional block D35 in FIG. 7B.

The output signal from the gate 620 is transmitted to one input each of an AND gate 636 and an AND gate 638. The AND gate 636 is enabled by the absence of both the signals COS TT-H and COS TT as determined by signals transmitted via an OR gate 610 and an inverter gate 616. The output signal from the gate 636 is transmitted to one input of an AND gate 644 which is enabled and transmits the status signal S24 during the junctor time slot JT15. If either of the signals COS TT-H or COS TT, are present as determined by the OR gate 610, an AND gate 638 is enabled when the gate 620 is enabled. When the gate 638 is enabled an AND gate 650 is enabled and transmits the status signal S54 to the status memory via an OR gate 640 during the junctor time slot JT14. The two status signals, S24 and S54 correspond to block D37 and block D45, respectively, in FIG. 7B.

The output signal from the gate 604 also enables an AND gate 612 which decodes the presence of the status 13 signal S13-H and the presence of the trunk consultation class-of-service signal COS TC (transmitted via an inverter gate 602). The output signal of the AND gate 612 therefore corresponds to the decisional block D41 in FIG. 7B. The output signal from the AND gate 612 enables an AND gate 624, an AND gate 622, and an AND gate 626. The AND gate 622 decodes the presence of the out bit signal OUT and has an output signal which enables an AND gate 648 during junctor time slot 14. The AND gate 648 transmits the storage signal, ED (BING), to the ED and ING memory. The AND gate 624 decodes the absence of both the COS TT-H and the COS TT signals are determined by the output of the OR gate 610 and is enabled and transmits an output signal (via the OR gate 640) which enables an AND gate 650 which transmits the status signal S54 during the junctor time slot 14.

The AND gate 626 senses the presence of either the COS TT-H or COS TT signals (vis the OR gate 610 and the inverter gate 616) and is enabled to enable an AND gate 646 which transmits the status signal S24 during the junctor time slot 15. These signals correspond to the decisional blocks D46 and D45, respectively, in FIG. 7B.

The presence of the END SEARCH signal and the absence of both the call waiting bit MCW and the COS TT-H signal are decoded in an AND gate 606. THe output signal from the gate 606 is transmitted to one input of an AND gate 628 which is enabled by the absence of the 47 COMP signal and the presence of the FLASH-H signal. High outputs from the AND gate 628 and from the AND gate 606 enables an AND gate 642 which generates as its output the signal FLX which initializes the local junctor LC and places the first trunk junctor TRK1 into a holding status 47.

The status progression from the trunk consultation status 24 (block B22) and the tie trunk control status 54 (block B29) to the trunk call in progress status 13 (B1 in FIG. 6) by means of a hookflash from the consulting party will now be more fully explained with reference to FIG. 7C.

The system first determines whether the consulting line has the class-of-service trunk consultation COS TC (block D47), that a hookflash has occurred (block D48) and that the junctor presently addressed is either in a trunk consultation status 24 or a tie trunk control status 54. The arrangement then interrogates whether the out bit is set (block D50) and if not, places a status S13 in the portion of the status memory associated with the junctor (block D53). If the output bit is set (yes in D50), a check is made for the presence of the signal ING PRES (block D51) and the presence of signal ED PRES (block D52). If both checks are affirmative the ED portion of the junctor memory associated with the presently addressed junctor is then zeroed by an ED O signal and a status 13 placed therein. If the Ed PRES signal is not stored, the junctor is released by a trunk release status S16 (block D54). The preceding decision allows the system to return to the trunk call in progress status 13 (block B1) and to release the second trunk junctor upon a hookflash (blocks B26 and B27, respectively, in FIG. 6).

The trunk junctor TRK1 has either an outgoing or incoming trunk call connected therein. If the call is incoming, there is no problem and the sequence D50, D53 stores the status 13 in the correct junctor TRK1 and releases TRK2. To differentiate, however, between the outgoing call in TRK2 (which is always outgoing and therefore, always has an ING number present) and an outgoing call in TRK1, the ED number was stored in the portion of the memory associated with the trunk junctor TRK1 during block D43 in FIG. 7B. The sequence, D51, D52 and D55, thus differentiates between the outgoing call in trunk junctor TRK1 and in trunk junctor TRK2 and releases the trunk junctor TRK2 (block D54) because an ED number is never present in the memory portion associated with the trunk junctor TRK1 and TRK2, and an ED number is always present in the TRK1.

Figure 8C:
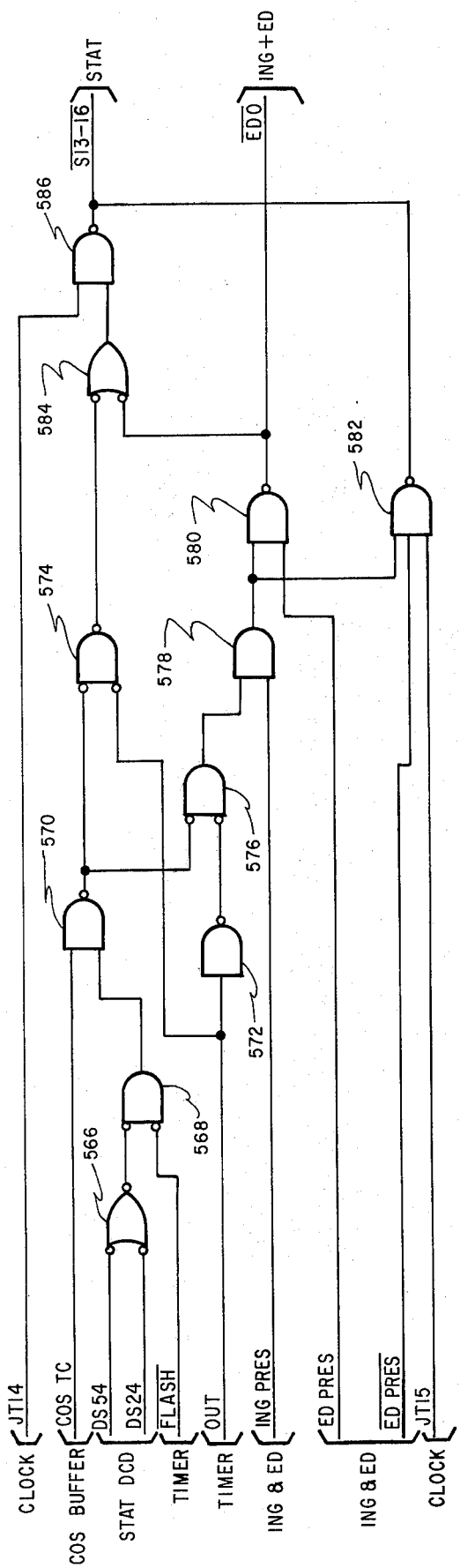

The functions illustrated in FIG. 7C are implemented by the logic circuitry shown in FIG. 8C. An OR gate 566 decodes either the presence of the status signal DS54 or the status signal DS24 transmitted from the status decoder. If either of these signals is present, an AND gate 568 is enabled by the presence of a flash signal and transmits an output signal to one input to an AND gate 570. The presence of the trunk consultation class-of-service signal COS TC then enables the AND gate 570 which tranmsits an output signal to one input each of an AND gate 574 and an AND gate 576. The AND gate 574 is enabled by the absence of the out bit signal OUT and tranmsits an output signal via an OR gate 584 to one input of an AND gate 586 which is enabled during the junctor time slot 14, JT14, and transmits the status signal S13 to the status memory. The presence of an out bit signal OUT (transmitted via an inverter gate 572) enables an AND gate 576. The output signal from the gate 576 is transmitted to one input of an AND gate 578 where the presence of an ING PRES signal is decoded. When the AND gate 578 is enabled, the gate 578 transmits an output signal which enables one input each of an AND gate 580 and an AND gate 582. The AND gate 580 transmits an output signal via an OR gate 584 to one output of an AND gate 586 which is enabled during the junctor time slot 14. The gate 586 generates the status signal S13 and, also, the ING and ED clear signal, ED O, if the signal Ed PRES is high. If the ED PRES signal is low, the AND gate 582 is enabled during junctor time slot 15 transmits the status signal S16.

While a preferred embodiment of the present invention has been illustrated, it will be apparent to those skilled in the art to which the invention pertains that various changes and modifications may be made therein without departing from the spirit and scope of the appended claims.

What is claimed is:

1. In a private automatic branch exchange (PABX) employing a cross point type switching matrix which connects local calling stations to local called stations and local stations to incoming and outgoing trunk parties by matrix connections made by the instrumentality of junctors, the combination comprising:
 a. a plurality of junctors and a corresponding plurality of operatively associated junctor memories, the junctors and their corresponding junctors memories forming a plurality of call circuit connecting and processing assist units, said assist units being operative to receive in their respective junctor memories the identity of calling and called stations and to receive progressively updated indicia of status states of a predetermined sequence of status states of a trunk consultation call, said assist units including local stations assist units which are employed to establish local station with local station matrix connections and trunk party assist units which are employed to establish local station with trunk party matrix connections,
 b. means for forwarding the assist unit association of said first consulting station from said first trunk assist unit to a local stations assist unit and for maintaining the assist unit association between said first trunk party and said first trunk party assist unit in a holding status, said latter means being operative after an initial call circuit between a consulting local station and a first trunk party is established by their common association with a first trunk party assist unit, said latter means being responsive to a first signal which is initiated by said consulting station and to a first predetermined status state present in the junctor memory of said first trunk party assist unit,
 c. means for associating the consulting station with a second trunk party assist unit and initiating the ringing of a second trunk party, and for terminating the association of the consulting station and the local stations assist unit, said latter means being responsive to a second signal which is of the dial impulse type initiated by said consulting station for dialing said second trunk party and to a second predetermined status state present in the junctor memory of said local stations assist unit, and
 e. means for establishing a consultation circuit between said consulting station and said second trunk party, said latter mens being responsive to a third signal which is of the off-hook type initiated by said second trunk party and to a third predetermined status state present in the junctor memory of said second trunk party assist unit.

2. The combination defined in claim 1, and;
 a. means for establishing a three-way conference circuit among (i) said consulting station, (ii) said first trunk party, and (iii) said second trunk party, said latter means being responsive to a fourth signal which is initiated by said consulting station and to a fourth predetermined status state present in at least one of the junctor memories of said first and second trunk party assist units.

3. The combination defined in claim 2, and;
 a. means for reverting to a two-way call circuit between the first and second trunk parties, said latter means being responsive to a fifth signal which is initiated by said consulting station and to a fifth predetermined status state present in at least one of the junctor memories of said first and second trunk party assist units.

4. The combination defined in claim 3, wherein;
 a. the trunk parties are of two types comprising:
 (i) a central office trunk type for which establishment of a two-way circuit with another central office trunk type party is unauthorized, and (ii) a tie trunk type,
 b. the trunk party assist units are further operative to receive in their respective junctor memories an indicium of the type of trunk party with which the assist unit is associated, and
 c. said means for reverting is operative to cause reversion to said two-way circuit only when there is present in the junctor memories of the first and second trunk party assist units an indicium that at least one of the first and second trunk parties is a tie trunk party.

5. The combination defined in claim 2, wherein;
 a. the first and fourth signals are hook-flash signals.

6. The combination defined in claim 1, wherein;
 a. the cross point type switching matrix is a space divided solid state matrix.

* * * * *